United States Patent
Yan et al.

(10) Patent No.: US 11,310,812 B2
(45) Date of Patent: Apr. 19, 2022

(54) DATA SENDING METHOD, DATA RECEIVING METHOD, USER EQUIPMENT, AND BASE STATION

(71) Applicant: Huawei Technologies Co., Ltd., Shenzhen (CN)

(72) Inventors: Zhiyu Yan, Shenzhen (CN); Lei Guan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 107 days.

(21) Appl. No.: 16/054,644

(22) Filed: Aug. 3, 2018

(65) Prior Publication Data
US 2018/0343665 A1 Nov. 29, 2018

Related U.S. Application Data

(63) Continuation of application No. PCT/CN2016/073571, filed on Feb. 4, 2016.

(51) Int. Cl.
*H04W 72/12* (2009.01)
*H04W 72/04* (2009.01)
*H04W 72/14* (2009.01)

(52) U.S. Cl.
CPC ..... *H04W 72/1268* (2013.01); *H04W 72/042* (2013.01); *H04W 72/0453* (2013.01);
(Continued)

(58) Field of Classification Search
None
See application file for complete search history.

(56) References Cited

U.S. PATENT DOCUMENTS

2010/0067479 A1  3/2010  Choi et al.
2010/0142455 A1* 6/2010  Imamura ............ H04W 52/367
                                                    370/329
(Continued)

FOREIGN PATENT DOCUMENTS

CN    101272615 A    9/2008
CN    101472300 A    7/2009
(Continued)

OTHER PUBLICATIONS

"3rd Generation Partnership Project; Technical Specification Group Radio Access Network; Evolved Universal Terrestrial Radio Access (E-UTRA); Physical layer procedures (Release 13)," 3GPP TS 36.213, V13.0.0, Dec. 2015, 326 Pages.
(Continued)

*Primary Examiner* — Nicholas Sloms
(74) *Attorney, Agent, or Firm* — Slater Matsil, LLP

(57) ABSTRACT

Embodiments of the present invention provide a data sending method, a data receiving method, user equipment, and a base station. The method includes: receiving, by UE, an uplink scheduling grant, where the uplink scheduling grant includes first resource indication information; determining, by the UE, a target resource based on the first resource indication information, where the target resource is allocated resource blocks in M basic resource elements; and sending, by the UE, uplink data on the target resource. In the embodiments of the present invention, service coverage of a base station can be significantly improved.

12 Claims, 6 Drawing Sheets

(52) U.S. Cl.
CPC ....... *H04W 72/0473* (2013.01); *H04W 72/12* (2013.01); *H04W 72/14* (2013.01)

(56) References Cited

U.S. PATENT DOCUMENTS

| | | | |
|---|---|---|---|
| 2010/0316011 A1* | 12/2010 | Lin | H04L 5/0094 370/329 |
| 2010/0329220 A1* | 12/2010 | Kim | H04W 72/1289 370/336 |
| 2011/0019637 A1* | 1/2011 | Ojala | H04L 1/0026 370/329 |
| 2012/0087331 A1* | 4/2012 | Seo | H04L 5/0044 370/329 |
| 2012/0155406 A1 | 6/2012 | Kim et al. | |
| 2012/0176996 A1* | 7/2012 | Kim | H04W 72/0413 370/329 |
| 2012/0236735 A1* | 9/2012 | Nory | H04W 52/367 370/252 |
| 2012/0243496 A1* | 9/2012 | Zhu | H04W 74/002 370/329 |
| 2012/0287885 A1 | 11/2012 | Dai | |
| 2012/0307771 A1* | 12/2012 | Yang | H04L 5/0091 370/329 |
| 2013/0039272 A1* | 2/2013 | Chen | H04W 72/042 370/328 |
| 2013/0044712 A1* | 2/2013 | Kim | H04L 5/0053 370/329 |
| 2013/0051356 A1* | 2/2013 | Hong | H04L 5/0053 370/329 |
| 2013/0102320 A1 | 4/2013 | Suzuki et al. | |
| 2013/0208645 A1* | 8/2013 | Feng | H04W 72/005 370/312 |
| 2013/0329684 A1* | 12/2013 | Horiuchi | H04W 72/0406 370/329 |
| 2014/0023047 A1* | 1/2014 | Aue | H04W 4/18 370/336 |
| 2014/0105151 A1* | 4/2014 | Hong | H04L 5/0012 370/329 |
| 2014/0169316 A1* | 6/2014 | Kim | H04L 5/0048 370/329 |
| 2014/0206375 A1* | 7/2014 | Ohta | H04W 72/0406 455/452.2 |
| 2014/0269593 A1* | 9/2014 | Wang | H04W 72/12 370/329 |
| 2014/0348089 A1 | 11/2014 | Lv et al. | |
| 2014/0369289 A1 | 12/2014 | Wang et al. | |
| 2015/0078222 A1* | 3/2015 | Yang | H04L 5/0092 370/280 |
| 2015/0103749 A1* | 4/2015 | Kela | H04L 1/1835 370/329 |
| 2015/0208387 A1* | 7/2015 | Awad | H04W 72/042 370/329 |
| 2015/0289234 A1* | 10/2015 | Zhao | H04L 1/0073 370/329 |
| 2015/0382379 A1* | 12/2015 | Kim | H04W 74/006 370/329 |
| 2016/0173247 A1* | 6/2016 | Patel | H04W 72/0446 370/329 |
| 2016/0205671 A1* | 7/2016 | Tabet | H04W 72/042 370/329 |
| 2016/0323870 A1* | 11/2016 | Wei | H04W 72/048 |
| 2017/0134129 A1* | 5/2017 | You | H04L 25/0226 |
| 2017/0142692 A1* | 5/2017 | Kim | H04W 72/14 |
| 2017/0332368 A1* | 11/2017 | Einhaus | H04B 7/0608 |
| 2018/0139014 A1* | 5/2018 | Xiong | H04L 1/1861 |
| 2018/0176788 A1* | 6/2018 | Yeo | H04L 5/0094 |
| 2019/0261255 A1* | 8/2019 | You | H04L 5/0092 |
| 2020/0281022 A1* | 9/2020 | Pelletier | H04W 72/0453 |

FOREIGN PATENT DOCUMENTS

| | | |
|---|---|---|
| CN | 102036387 A | 4/2011 |
| CN | 103875279 A | 6/2014 |
| CN | 104054366 A | 9/2014 |
| CN | 104349479 A | 2/2015 |
| JP | 2011142532 A | 7/2011 |
| WO | 2008054157 A2 | 5/2008 |

OTHER PUBLICATIONS

"3rd Generation Partnership Project; Technical Specification Group Radio Access Network; Evolved Universal Terrestrial Radio Access (E-UTRA); Multiplexing and channel Coding (Release 13)", 3GPP TS 36 212, V13.0.0, Dec. 2015, 121 Pages.

"3rd Generation Partnership Project; Technical Specification Group Radio Access Network Evolved Universal Terrestrial Radio Access (E-UTRA);Physical channels and modulation, (Release 13),"3GPP TS 36.211, V13.0.0, Dec. 2015, 141 Pages.

Qualcomm Incorporated, "Uplink Waveform for LAA," 3GPP TSG RAN WG1 #81, R1-152790, Apr. 25-29, 2015, 4 Pages, Fukuoka, Japan.

* cited by examiner

One basic resource element:
$P_1$ RBs

DATA SENDING METHOD, DATA RECEIVING METHOD, USER EQUIPMENT, AND BASE STATION

CROSS-REFERENCE TO RELATED APPLICATIONS

This application is a continuation of International Application No. PCT/CN2016/073571, filed on Feb. 4, 2016, the disclosure of which is hereby incorporated by reference in its entirety.

TECHNICAL FIELD

The present invention relates to the field of communications technologies, and in particular, to a data sending method, a data receiving method, user equipment, and a base station.

BACKGROUND

In a Long Term Evolution (LTE) system, transmission of an uplink service is based on scheduling by a base station. A basic time unit of scheduling is a subframe, and one subframe includes a plurality of time-domain symbols. In a specific scheduling procedure, a base station sends a control channel to user equipment (UE). The control channel may carry scheduling information of a physical uplink shared channel (PUSCH), and the scheduling information includes control information such as resource allocation information and a modulation and encoding scheme. The UE detects the scheduling information carried in the control channel, to receive downlink data or send uplink data. When sending data, the UE combines uplink time-frequency-domain physical resources into a physical resource block (PRB). The physical resource block is used as a physical resource element for scheduling and allocation. One PRB includes 12 consecutive subcarriers in frequency domain, and includes seven consecutive orthogonal frequency division multiplexing (OFDM) symbols in time domain, that is, a frequency-domain width is 180 kHz, and a time length is 0.5 ms. PRBs in two timeslots in one subframe form one PRB-pair that is referred to as a resource block (RB).

In the prior art, a channel resource for sending a PUSCH by UE is allocated by using two resource allocation manners. According to a first resource allocation manner, one RB or a plurality of consecutive RBs in frequency domain is/are allocated to one UE. According to a second resource allocation manner, two RB sets that are nonconsecutive in frequency domain are allocated to one UE, and each RB set includes one RB or a plurality of consecutive RBs in frequency domain.

When sending data on an unlicensed spectrum resource, UE needs to meet a limitation imposed by a requirement on a power spectral density for sending data, and a limitation condition is that transmit power of the UE should not exceed 10 dBm or 7 dBm per MHz. If the foregoing two existing resource allocation manners are used, total transmit power of the UE is limited by a quantity of RBs that are allocated to the UE and that are consecutive in frequency domain, and consequently service coverage of a base station is affected.

SUMMARY

Embodiments of the present invention provide a data sending method, a data receiving method, user equipment (UE), and a base station, so as to improve transmit power of the UE while meeting a limitation requirement on a power spectral density when the UE sends data on a carrier on an unlicensed spectrum.

According to a first aspect, an embodiment of the present invention provides a data sending method, including: receiving, by user equipment UE, an uplink scheduling grant, where the uplink scheduling grant includes first resource indication information; determining, by the UE, a target resource based on the first resource indication information, where the target resource is allocated resource blocks in M basic resource elements, the M basic resource elements are basic resource elements in N basic resource elements on a carrier, the carrier is a carrier that is indicated by the uplink scheduling grant and that is used by the UE to send uplink data, each basic resource element includes at least one resource block, M and N are natural numbers, and M is not greater than N; and sending, by the UE, the uplink data on the target resource.

Further, the M basic resource elements are M preset basic resource elements in the N basic resource elements; or the method further includes: receiving, by the UE, second resource indication information, where the second resource indication information is used to indicate location information of the M basic resource elements in the N basic resource elements; and determining, by the UE, a location of the M basic resource elements based on the second resource indication information.

Further, the N basic resource elements are divided into P basic resource element groups, and each of the P basic resource element groups includes at least one basic resource element; and the second resource indication information is used to indicate location information of the M basic resource elements in one of the P basic resource element groups.

Further, the first resource indication information is used to indicate location information of allocated resource blocks in one basic resource element, and the determining, by the UE, a target resource based on the first resource indication information includes: determining, by the UE, allocated resource blocks in each of the M basic resource elements based on the location information that is of the allocated resource blocks in the one basic resource element and that is indicated in the first resource indication information, and combining the allocated resource blocks into the target resource.

Further, when each of the M basic resource elements includes a same quantity of resource blocks, the UE determines the allocated resource blocks in each of the M basic resource elements based on the location information that is of the allocated resource blocks in the one basic resource element and that is indicated in the first resource indication information, and combines the allocated resource blocks into the target resource, where a location of the allocated resource blocks in each of the M basic resource elements is the same as a location indicated by the first resource indication information; or when R basic resource elements in the M basic resource elements include a same quantity of resource blocks, where the quantity is $P_1$, and a quantity of resource blocks included in each of remaining M-R basic resource elements is not equal to $P_1$, the UE determines allocated resource blocks in each of the R basic resource elements and an allocated resource block in each of the M-R basic resource elements based on the location information that is of the allocated resource blocks in the one basic resource element and that is indicated in the first resource indication information, and combines the allocated resource blocks into the target resource, where a location of the allocated resource blocks in each of the R basic resource elements is the same as a location indicated by the first resource indication information, and the allocated resource block in each of the M-R basic resource elements is a resource block, in the basic resource element, that is corresponding to the location information indicated in the first resource indication information.

Further, the first resource indication information is used to indicate location information of L basic resource elements in the M basic resource elements, and the determining, by the UE, a target resource based on the first resource indication information includes: determining, by the UE, a location of the L basic resource elements based on the first resource indication information; and determining, by the UE, all resource blocks included in the L basic resource elements, and combining the resource blocks into the target resource.

Further, the first resource indication information is used to indicate location information of L basic resource elements in the M basic resource elements and location information of allocated resource blocks in one of the L basic resource elements, and the determining, by the UE, a target resource based on the first resource indication information includes: determining, by the UE, a location of the L basic resource elements based on the location information of the L basic resource elements that is indicated in the first resource indication information; and determining, by the UE, allocated resource blocks in each of the L basic resource elements based on the location information that is of the allocated resource blocks in the one basic resource element and that is indicated in the first resource indication information, and combining the allocated resource blocks into the target resource.

Further, when each of the L basic resource elements includes a same quantity of resource blocks, the UE determines the allocated resource blocks in each of the L basic resource elements based on the location information that is of the allocated resource blocks in the one basic resource element and that is indicated in the first resource indication information, and combines the allocated resource blocks into the target resource, where a location of the allocated resource blocks in each of the L basic resource elements is the same as a location indicated by the first resource indication information; or when G basic resource elements in the L basic resource elements include a same quantity of resource blocks, where the quantity is $P_1$, and a quantity of resource blocks included in each of remaining L-G basic resource elements is not equal to $P_1$, the UE determines allocated resource blocks in each of the G basic resource elements and an allocated resource block in each of the L-G basic resource elements based on the location information that is of the allocated resource blocks in the one basic resource element and that is indicated in the first resource indication information, and combines the allocated resource blocks into the target resource, where a location of the allocated resource blocks in each of the G basic resource elements is the same as a location indicated by the first resource indication information, and the allocated resource block in each of the L-G basic resource elements is a resource block, in the basic resource element, that is corresponding to the location information indicated in the first resource indication information.

Further, the UE determines a resource allocation type on the carrier used by the UE to send the uplink data; and if the determined resource allocation type is a first resource-block-based resource allocation type, the UE determines a location of a start resource block and a location of an end resource block in the allocated resource on the carrier based on resource allocation indication information in the uplink scheduling grant, and sends the uplink data on the start resource block, the end resource block, and all resource blocks between the start resource block and the end resource block; and/or if the determined resource allocation type is a second resource-block-based resource allocation type, the UE determines a location of a first start resource block, a location of a first end resource block, a location of a second start resource block, and a location of a second end resource block in the allocated resource on the carrier based on resource allocation indication information in the uplink scheduling grant, and sends the uplink data on the target resource consisting of the first start resource block, the first end resource block, all resource blocks between the first start resource block and the first end resource block, the second start resource block, the second end resource block, and all resource blocks between the second start resource block and the second end resource block.

Further, the determining, by the UE, a resource allocation type on the carrier used by the UE to send the uplink data includes: determining, by the UE, the resource allocation type on the carrier depending on whether the carrier is a carrier on an unlicensed spectrum; or receiving, by the UE, third resource indication information, and determining the resource allocation type on the carrier based on the third resource indication information, where the third resource indication information is indication information received by the UE by using higher layer signaling or is information carried in the uplink scheduling grant.

According to a second aspect, an embodiment of the present invention provides a data receiving method, including: sending, by a base station, an uplink scheduling grant to user equipment UE, where the uplink scheduling grant includes first resource indication information, so that the UE determines a target resource based on the first resource indication information, the target resource is allocated resource blocks in M basic resource elements, the M basic resource elements are basic resource elements in N basic resource elements on a carrier, the carrier is a carrier that is indicated by the uplink scheduling grant and that is used by the UE to send uplink data, each basic resource element includes at least one resource block, M and N are natural numbers, and M is not greater than N; and receiving, by the base station, the uplink data sent by the UE on the target resource.

Further, the M basic resource elements are M preset basic resource elements in the N basic resource elements; or the method further includes: sending, by the base station, second resource indication information to the UE, where the second resource indication information is used to indicate location information of the M basic resource elements in the N basic resource elements to the UE, so that the UE determines a location of the M basic resource elements based on the second resource indication information.

Further, the N basic resource elements are divided into P basic resource element groups, and each of the P basic resource element groups includes at least one basic resource element; and the second resource indication information is used to indicate location information of the M basic resource elements in one of the P basic resource element groups.

Further, the first resource indication information is used to indicate location information of allocated resource blocks in one basic resource element, so that the UE determines allocated resource blocks in each of the M basic resource elements based on the location information that is of the allocated resource blocks in the one basic resource element and that is indicated in the first resource indication information, and combines the allocated resource blocks into the target resource.

Further, the first resource indication information is used to indicate location information of L basic resource elements in the M basic resource elements, so that the UE determines, based on a location of the L basic resource elements, all resource blocks included in the L basic resource elements, and combines the resource blocks into the target resource.

Further, the first resource indication information is used to indicate location information of L basic resource elements in the M basic resource elements and location information of allocated resource blocks in one of the L basic resource elements, so that the UE determines a location of the L basic resource elements based on the first resource indication information, determines allocated resource blocks in each of the L basic resource elements based on the location information that is of the allocated resource blocks in the one basic resource element and that is indicated in the first resource indication information, and combines the allocated resource blocks into the target resource.

Further, the method includes: sending, by the base station, third resource indication information to the UE, where the third resource indication information is used to indicate that a resource allocation type on the carrier is a basic-resource-element-based resource allocation type or a resource-block-based resource allocation type, the resource-block-based resource allocation type includes a first resource-block-based resource allocation type and/or a second resource-block-based resource allocation type, and the third resource indication information is indication information sent by the base station to the UE by using higher layer signaling or is indication information carried in the uplink scheduling grant.

According to a third aspect, an embodiment of the present invention provides user equipment, including: a receiving module, configured to receive an uplink scheduling grant, where the uplink scheduling grant includes first resource indication information; a processing module, configured to determine a target resource based on the first resource indication information, where the target resource is allocated resource blocks in M basic resource elements, the M basic resource elements are basic resource elements in N basic resource elements on a carrier, the carrier is a carrier that is indicated by the uplink scheduling grant and that is used by the user equipment UE to send uplink data, each basic resource element includes at least one resource block, M and N are natural numbers, and M is not greater than N; and a sending module, configured to send the uplink data on the target resource.

Further, the M basic resource elements are M preset basic resource elements in the N basic resource elements; or the receiving module is further configured to: receive second resource indication information, where the second resource indication information is used to indicate location information of the M basic resource elements in the N basic resource elements; and the processing module is further configured to determine a location of the M basic resource elements based on the second resource indication information.

Further, the N basic resource elements are divided into P basic resource element groups, and each of the P basic resource element groups includes at least one basic resource element; and the second resource indication information is used to indicate location information of the M basic resource elements in one of the P basic resource element groups.

Further, the first resource indication information is used to indicate location information of allocated resource blocks in one basic resource element, and the processing module is specifically configured to: determine allocated resource blocks in each of the M basic resource elements based on the location information that is of the allocated resource blocks in the one basic resource element and that is indicated in the first resource indication information, and combine the allocated resource blocks into the target resource.

Further, when each of the M basic resource elements includes a same quantity of resource blocks, the processing module determines the allocated resource blocks in each of the M basic resource elements based on the location information that is of the allocated resource blocks in the one basic resource element and that is indicated in the first resource indication information, and combines the allocated resource blocks into the target resource, where a location of the allocated resource blocks in each of the M basic resource elements is the same as a location indicated by the first resource indication information; or when R basic resource elements in the M basic resource elements include a same quantity of resource blocks, where the quantity is $P_1$, and a quantity of resource blocks included in each of remaining M-R basic resource elements is not equal to $P_1$, the processing module determines allocated resource blocks in each of the R basic resource elements and an allocated resource block in each of the M-R basic resource elements based on the location information that is of the allocated resource blocks in the one basic resource element and that is indicated in the first resource indication information, and combines the allocated resource blocks into the target resource, where a location of the allocated resource blocks in each of the R basic resource elements is the same as a location indicated by the first resource indication information, and the allocated resource block in each of the M-R basic resource elements is a resource block, in the basic resource element, that is corresponding to the location information indicated in the first resource indication information.

Further, the first resource indication information is used to indicate location information of L basic resource elements in the M basic resource elements, and the processing module is specifically configured to: determine a location of the L basic resource elements based on the first resource indication information; and determine all resource blocks included in the L basic resource elements, and combine the resource blocks into the target resource.

Further, the first resource indication information is used to indicate location information of L basic resource elements in the M basic resource elements and location information of allocated resource blocks in one of the L basic resource elements, and the processing module is specifically configured to: determine a location of the L basic resource elements based on the location information of the L basic resource elements that is indicated in the first resource indication information; and determine allocated resource blocks in each of the L basic resource elements based on the location information that is of the allocated resource blocks in the one basic resource element and that is indicated in the first resource indication information, and combine the allocated resource blocks into the target resource.

Further, when each of the L basic resource elements includes a same quantity of resource blocks, the processing module determines the allocated resource blocks in each of the L basic resource elements based on the location information that is of the allocated resource blocks in the one basic resource element and that is indicated in the first resource indication information, and combines the allocated resource blocks into the target resource, where a location of the allocated resource blocks in each of the L basic resource elements is the same as a location indicated by the first resource indication information; or when G basic resource elements in the L basic resource elements include a same quantity of resource blocks, where the quantity is $P_1$, and a quantity of resource blocks included in each of remaining L-G basic resource elements is not equal to $P_1$, the processing module determines allocated resource blocks in each of the G basic resource elements and an allocated resource block in each of the L-G basic resource elements based on the location information that is of the allocated resource blocks in the one basic resource element and that is indicated in the first resource indication information, and combines the allocated resource blocks into the target resource, where a location of the allocated resource blocks in each of the G basic resource elements is the same as a location indicated by the first resource indication information, and the allocated resource block in each of the L-G basic resource elements is a resource block, in the basic resource element, that is corresponding to the location information indicated in the first resource indication information.

Further, the user equipment includes: a determining module, where the determining module is configured to determine a resource allocation type on the carrier used by the UE to send the uplink data, where if the determined resource allocation type is a first resource-block-based resource allocation type, the UE determines a location of a start resource block and a location of an end resource block in the allocated resource on the carrier based on resource allocation indication information in the uplink scheduling grant, and sends the uplink data on the start resource block, the end resource block, and all resource blocks between the start resource block and the end resource block; and/or if the determined resource allocation type is a second resource-block-based resource allocation type, the UE determines a location of a first start resource block, a location of a first end resource block, a location of a second start resource block, and a location of a second end resource block in the allocated resource on the carrier based on resource allocation indication information in the uplink scheduling grant, and sends the uplink data on the target resource consisting of the first start resource block, the first end resource block, all resource blocks between the first start resource block and the first end resource block, the second start resource block, the second end resource block, and all resource blocks between the second start resource block and the second end resource block.

Further, the determining module is specifically configured to: determine the resource allocation type on the carrier depending on whether the carrier is a carrier on an unlicensed spectrum; or the receiving module is further configured to receive third resource indication information; and the determining module is specifically configured to determine the resource allocation type on the carrier based on the third resource indication information, where the third resource indication information is indication information received by the UE by using higher layer signaling or is information carried in the uplink scheduling grant.

According to a fourth aspect, an embodiment of the present invention provides a base station, including: a sending module, configured to send an uplink scheduling grant to user equipment UE, where the uplink scheduling grant includes first resource indication information, so that the UE determines a target resource based on the first resource indication information, the target resource is allocated resource blocks in M basic resource elements, the M basic resource elements are basic resource elements in N basic resource elements on a carrier, the carrier is a carrier that is indicated by the uplink scheduling grant and that is used by the UE to send uplink data, each basic resource element includes at least one resource block, M and N are natural numbers, and M is not greater than N; and a receiving module, configured to receive the uplink data sent by the UE on the target resource.

Further, the M basic resource elements are M preset basic resource elements in the N basic resource elements; or the sending module is further configured to: send second resource indication information to the UE, where the second resource indication information is used to indicate location information of the M basic resource elements in the N basic resource elements to the UE, so that the UE determines a location of the M basic resource elements based on the second resource indication information.

Further, the N basic resource elements are divided into P basic resource element groups, and each of the P basic resource element groups includes at least one basic resource element; and the second resource indication information is used to indicate location information of the M basic resource elements in one of the P basic resource element groups.

Further, the first resource indication information is used to indicate location information of allocated resource blocks in one basic resource element, so that the UE determines allocated resource blocks in each of the M basic resource elements based on the location information that is of the allocated resource blocks in the one basic resource element and that is indicated in the first resource indication information, and combines the allocated resource blocks into the target resource.

Further, the first resource indication information is used to indicate location information of L basic resource elements in the M basic resource elements, so that the UE determines, based on a location of the L basic resource elements, all resource blocks included in the L basic resource elements, and combines the resource blocks into the target resource.

Further, the first resource indication information is used to indicate location information of L basic resource elements in the M basic resource elements and location information of allocated resource blocks in one of the L basic resource elements, so that the UE determines a location of the L basic resource elements based on the first resource indication information, determines allocated resource blocks in each of the L basic resource elements based on the location information that is of the allocated resource blocks in the one basic resource element and that is indicated in the first resource indication information, and combines the allocated resource blocks into the target resource.

Further, the sending module is configured to: send third resource indication information to the UE, where the third resource indication information is used to indicate that a resource allocation type on the carrier is a basic-resource-element-based resource allocation type or a resource-block-based resource allocation type, the resource-block-based resource allocation type includes a first resource-block-based resource allocation type and/or a second resource-block-based resource allocation type, and the third resource indication information is indication information sent by the base station to the UE by using higher layer signaling or is indication information carried in the uplink scheduling grant.

According to a fifth aspect, an embodiment of the present invention provides user equipment, including: a receiver, configured to receive an uplink scheduling grant, where the uplink scheduling grant includes first resource indication information; a processor, configured to determine a target resource based on the first resource indication information, where the target resource is allocated resource blocks in M basic resource elements, the M basic resource elements are basic resource elements in N basic resource elements on a carrier, the carrier is a carrier that is indicated by the uplink scheduling grant and that is used by the UE to send uplink data, each basic resource element includes at least one resource block, M and N are natural numbers, and M is not greater than N; and a transmitter, configured to send the uplink data on the target resource.

Further, the M basic resource elements are M preset basic resource elements in the N basic resource elements; or the receiver is further configured to: receive second resource indication information, where the second resource indication information is used to indicate location information of the M basic resource elements in the N basic resource elements; and the processor is further configured to determine a location of the M basic resource elements based on the second resource indication information.

Further, the N basic resource elements are divided into P basic resource element groups, and each of the P basic resource element groups includes at least one basic resource element; and the second resource indication information is used to indicate location information of the M basic resource elements in one of the P basic resource element groups.

Further, the first resource indication information is used to indicate location information of allocated resource blocks in one basic resource element, and the processor is specifically configured to: determine allocated resource blocks in each of the M basic resource elements based on the location information that is of the allocated resource blocks in the one basic resource element and that is indicated in the first resource indication information, and combine the allocated resource blocks into the target resource.

Further, when each of the M basic resource elements includes a same quantity of resource blocks, the processor determines the allocated resource blocks in each of the M basic resource elements based on the location information that is of the allocated resource blocks in the one basic resource element and that is indicated in the first resource indication information, and combines the allocated resource blocks into the target resource, where a location of the allocated resource blocks in each of the M basic resource elements is the same as a location indicated by the first resource indication information; or when R basic resource elements in the M basic resource elements include a same quantity of resource blocks, where the quantity is $P_1$, and a quantity of resource blocks included in each of remaining M-R basic resource elements is not equal to $P_1$, the processor determines allocated resource blocks in each of the R basic resource elements and an allocated resource block in each of the M-R basic resource elements based on the location information that is of the allocated resource blocks in the one basic resource element and that is indicated in the first resource indication information, and combines the allocated resource blocks into the target resource, where a location of the allocated resource blocks in each of the R basic resource elements is the same as a location indicated by the first resource indication information, and the allocated resource block in each of the M-R basic resource elements is a resource block, in the basic resource element, that is corresponding to the location information indicated in the first resource indication information.

Further, the first resource indication information is used to indicate location information of L basic resource elements in the M basic resource elements, and the processor is specifically configured to: determine a location of the L basic resource elements based on the first resource indication information; and determine all resource blocks included in the L basic resource elements, and combine the resource blocks into the target resource.

Further, the first resource indication information is used to indicate location information of L basic resource elements in the M basic resource elements and location information of allocated resource blocks in one of the L basic resource elements, and the processor is specifically configured to: determine a location of the L basic resource elements based on the location information of the L basic resource elements that is indicated in the first resource indication information; and determine allocated resource blocks in each of the L basic resource elements based on the location information that is of the allocated resource blocks in the one basic resource element and that is indicated in the first resource indication information, and combine the allocated resource blocks into the target resource.

Further, when each of the L basic resource elements includes a same quantity of resource blocks, the processor determines the allocated resource blocks in each of the L basic resource elements based on the location information that is of the allocated resource blocks in the one basic resource element and that is indicated in the first resource indication information, and combines the allocated resource blocks into the target resource, where a location of the allocated resource blocks in each of the L basic resource elements is the same as a location indicated by the first resource indication information; or when G basic resource elements in the L basic resource elements include a same quantity of resource blocks, where the quantity is $P_1$, and a quantity of resource blocks included in each of remaining L-G basic resource elements is not equal to $P_1$, the processor determines allocated resource blocks in each of the G basic resource elements and an allocated resource block in each of the L-G basic resource elements based on the location information that is of the allocated resource blocks in the one basic resource element and that is indicated in the first resource indication information, and combines the allocated resource blocks into the target resource, where a location of the allocated resource blocks in each of the G basic resource elements is the same as a location indicated by the first resource indication information, and the allocated resource block in each of the L-G basic resource elements is a resource block, in the basic resource element, that is corresponding to the location information indicated in the first resource indication information.

Further, the processor is configured to: determine a resource allocation type on the carrier used by the UE to send the uplink data, where if the determined resource allocation type is a first resource-block-based resource allocation type, the UE determines a location of a start resource block and a location of an end resource block in the allocated resource on the carrier based on resource allocation indication information in the uplink scheduling grant, and sends the uplink data on the start resource block, the end resource block, and all resource blocks between the start resource block and the end resource block; and/or if the determined resource allocation type is a second resource-block-based resource allocation type, the UE determines a location of a first start resource block, a location of a first end resource block, a location of a second start resource block, and a location of a second end resource block in the allocated resource on the carrier based on resource allocation indication information in the uplink scheduling grant, and sends the uplink data on the target resource consisting of the first start resource block, the first end resource block, all resource blocks between the first start resource block and the first end resource block, the second start resource block, the second end resource block, and all resource blocks between the second start resource block and the second end resource block.

Further, the processor is specifically configured to: determine the resource allocation type on the carrier depending on whether the carrier is a carrier on an unlicensed spectrum; or the receiver is further configured to receive third resource indication information; and the processor is specifically configured to determine the resource allocation type on the carrier based on the third resource indication information, where the third resource indication information is indication information received by the UE by using higher layer signaling or is information carried in the uplink scheduling grant.

According to a sixth aspect, an embodiment of the present invention provides a base station, including: a transmitter, configured to send an uplink scheduling grant to user equipment UE, where the uplink scheduling grant includes first resource indication information, so that the UE determines a target resource based on the first resource indication information, the target resource is allocated resource blocks in M basic resource elements, the M basic resource elements are basic resource elements in N basic resource elements on a carrier, the carrier is a carrier that is indicated by the uplink scheduling grant and that is used by the UE to send uplink data, each basic resource element includes at least one resource block, M and N are natural numbers, and M is not greater than N; and a receiver, configured to receive the uplink data sent by the UE on the target resource.

Further, the M basic resource elements are M preset basic resource elements in the N basic resource elements; or the transmitter is further configured to: send second resource indication information to the UE, where the second resource indication information is used to indicate location information of the M basic resource elements in the N basic resource elements to the UE, so that the UE determines a location of the M basic resource elements based on the second resource indication information.

Further, the N basic resource elements are divided into P basic resource element groups, and each of the P basic resource element groups includes at least one basic resource element; and the second resource indication information is used to indicate location information of the M basic resource elements in one of the P basic resource element groups.

Further, the first resource indication information is used to indicate location information of allocated resource blocks in one basic resource element, so that the UE determines allocated resource blocks in each of the M basic resource elements based on the location information that is of the allocated resource blocks in the one basic resource element and that is indicated in the first resource indication information, and combines the allocated resource blocks into the target resource.

Further, the first resource indication information is used to indicate location information of L basic resource elements in the M basic resource elements, so that the UE determines, based on a location of the L basic resource elements, all resource blocks included in the L basic resource elements, and combines the resource blocks into the target resource.

Further, the first resource indication information is used to indicate location information of L basic resource elements in the M basic resource elements and location information of allocated resource blocks in one of the L basic resource elements, so that the UE determines a location of the L basic resource elements based on the first resource indication information, determines allocated resource blocks in each of the L basic resource elements based on the location information that is of the allocated resource blocks in the one basic resource element and that is indicated in the first resource indication information, and combines the allocated resource blocks into the target resource.

Further, the transmitter is configured to: send third resource indication information to the UE, where the third resource indication information is used to indicate that a resource allocation type on the carrier is a basic-resource-element-based resource allocation type or a resource-block-based resource allocation type, and the third resource indication information is indication information sent by the base station to the UE by using higher layer signaling or is indication information carried in the uplink scheduling grant.

According to a seventh aspect, an embodiment of the present invention provides a data sending method, including: receiving, by user equipment UE, an uplink scheduling grant, where the uplink scheduling grant includes first resource indication information; determining, by the UE, a target resource based on the first resource indication information, where a resource indicated by the first resource indication information consists of P resource blocks, the P resource blocks are resource blocks on a carrier, and the carrier is a carrier that is indicated by the uplink scheduling grant and that is used by the UE to send uplink data, where if P satisfies $P=2^{\alpha_2} \cdot 3^{\alpha_3} \cdot 5^{\alpha_5}$, where $\alpha_2$, $\alpha_3$, $\alpha_5$ are nonnegative integers, the target resource is the P resource blocks; or if P does not satisfy $P=2^{\alpha_2} \cdot 3^{\alpha_3} \cdot 5^{\alpha_5}$, where $\alpha_2$, $\alpha_3$, $\alpha_5$ are nonnegative integers, the target resource is Q resource blocks, where Q is a largest integer that satisfies $Q=2^{\alpha_2} \cdot 3^{\alpha_3} \cdot 5^{\alpha_5}$ and Q<P, and $\alpha_2$, $\alpha_3$, $\alpha_5$ are nonnegative integers; and sending, by the UE, the uplink data on the target resource.

Further, the Q resource blocks are Q resource blocks whose resource block index values are the largest in the P resource blocks; or the Q resource blocks are Q resource blocks whose resource block index values are the smallest in the P resource blocks.

According to an eighth aspect, an embodiment of the present invention provides a data receiving method, including: sending, by a base station, an uplink scheduling grant to user equipment UE, where the uplink scheduling grant includes first resource indication information, so that the UE determines a target resource based on the first resource indication information, a resource indicated by the first resource indication information consists of P resource blocks, the P resource blocks are resource blocks on a carrier, the carrier is a carrier that is indicated by the uplink scheduling grant and that is used by the UE to send uplink data, and if P satisfies $P=2^{\alpha_2} \cdot 3^{\alpha_3} \cdot 5^{\alpha_5}$, where $\alpha_2$, $\alpha_3$, $\alpha_5$ are nonnegative integers, the target resource is the P resource blocks; or if P does not satisfy $P=2^{\alpha_2} \cdot 3^{\alpha_3} \cdot 5^{\alpha_5}$, where $\alpha_2$, $\alpha_3$, $\alpha_5$ are nonnegative integers, the target resource is Q resource blocks, where Q is a largest integer that satisfies $Q=2^{\alpha_2} \cdot 3^{\alpha_3} \cdot 5^{\alpha_5}$ and Q<P, and $\alpha_2$, $\alpha_3$, $\alpha_5$ are nonnegative integers; and receiving, by the base station, the uplink data sent by the UE on the target resource.

Further, the Q resource blocks are Q resource blocks whose resource block index values are the largest in the P resource blocks; or the Q resource blocks are Q resource blocks whose resource block index values are the smallest in the P resource blocks.

According to a ninth aspect, an embodiment of the present invention provides user equipment, including: a receiving module, configured to receive an uplink scheduling grant, where the uplink scheduling grant includes first resource indication information; a processing module, configured to determine a target resource based on the first resource indication information, where a resource indicated by the first resource indication information consists of P resource blocks, the P resource blocks are resource blocks on a carrier, and the carrier is a carrier that is indicated by the uplink scheduling grant and that is used by the UE to send uplink data, where if P satisfies $P=2^{\alpha_2} \cdot 3^{\alpha_3} \cdot 5^{\alpha_5}$, where $\alpha_2$, $\alpha_3$, $\alpha_5$ are nonnegative integers, the target resource is the P resource blocks; or if P does not satisfy $P=2^{\alpha_2} \cdot 3^{\alpha_3} \cdot 5^{\alpha_5}$, where $\alpha_2$, $\alpha_3$, $\alpha_5$ are nonnegative integers, the target resource is Q resource blocks, where Q is a largest integer that satisfies $Q=2^{\alpha_2} \cdot 3^{\alpha_3} \cdot 5^{\alpha_5}$ and Q<P, and $\alpha_2$, $\alpha_3$, $\alpha_5$ are nonnegative integers; and a sending module, configured to send the uplink data on the target resource.

Further, the Q resource blocks are Q resource blocks whose resource block index values are the largest in the P resource blocks; or the Q resource blocks are Q resource blocks whose resource block index values are the smallest in the P resource blocks.

According to a tenth aspect, an embodiment of the present invention provides a base station, including: a sending module, configured to send an uplink scheduling grant, where the uplink scheduling grant includes first resource indication information, so that the UE determines a target resource based on the first resource indication information, a resource indicated by the first resource indication information consists of P resource blocks, the P resource blocks are resource blocks on a carrier, the carrier is a carrier that is indicated by the uplink scheduling grant and that is used by the UE to send uplink data, and if P satisfies $P=2^{\alpha_2} \cdot 3^{\alpha_3} \cdot 5^{\alpha_5}$, where $\alpha_2$, $\alpha_3$, $\alpha_5$ are nonnegative integers, the target resource is the P resource blocks; or if P does not satisfy $P=2^{\alpha_2} \cdot 3^{\alpha_3} \cdot 5^{\alpha_5}$, where $\alpha_2$, $\alpha_3$, $\alpha_5$ are nonnegative integers, the target resource is Q resource blocks, where Q is a largest integer that satisfies $Q=2^{\alpha_2} \cdot 3^{\alpha_3} \cdot 5^{\alpha_5}$ and Q<P, and $\alpha_2$, $\alpha_3$, $\alpha_5$ are nonnegative integers; and a receiving module, configured to receive the uplink data sent by the UE on the target resource.

Further, the Q resource blocks are Q resource blocks whose resource block index values are the largest in the P resource blocks; or the Q resource blocks are Q resource blocks whose resource block index values are the smallest in the P resource blocks.

According to an eleventh aspect, an embodiment of the present invention provides user equipment, including: a receiver, configured to receive an uplink scheduling grant, where the uplink scheduling grant includes first resource indication information; a processor, configured to determine a target resource based on the first resource indication information, where a resource indicated by the first resource indication information consists of P resource blocks, the P resource blocks are resource blocks on a carrier, and the carrier is a carrier that is indicated by the uplink scheduling grant and that is used by the UE to send uplink data, where if P satisfies $P=2^{\alpha_2} \cdot 3^{\alpha_3} \cdot 5^{\alpha_5}$, where $\alpha_2$, $\alpha_3$, $\alpha_5$ are nonnegative integers, the target resource is the P resource blocks; or if P does not satisfy $P=2^{\alpha_2} \cdot 3^{\alpha_3} \cdot 5^{\alpha_5}$, where $\alpha_2$, $\alpha_3$, $\alpha_5$ are nonnegative integers, the target resource is Q resource blocks, where Q is a largest integer that satisfies $Q=2^{\alpha_2} \cdot 3^{\alpha_3} \cdot 5^{\alpha_5}$ and Q<P, and $\alpha_2$, $\alpha_3$, $\alpha_5$ are nonnegative integers; and a transmitter, configured to send the uplink data on the target resource.

Further, the Q resource blocks are Q resource blocks whose resource block index values are the largest in the P resource blocks; or the Q resource blocks are Q resource blocks whose resource block index values are the smallest in the P resource blocks.

According to a twelfth aspect, an embodiment of the present invention provides a base station, including: a transmitter, configured to send an uplink scheduling grant, where the uplink scheduling grant includes first resource indication information, so that the UE determines a target resource based on the first resource indication information, a resource indicated by the first resource indication information consists of P resource blocks, the P resource blocks are resource blocks on a carrier, the carrier is a carrier that is indicated by the uplink scheduling grant and that is used by the UE to send uplink data, and if P satisfies $P=2^{\alpha_2} \cdot 3^{\alpha_3} \cdot 5^{\alpha_5}$, where $\alpha_2$, $\alpha_3$, $\alpha_5$ are nonnegative integers, the target resource is the P resource blocks; or if P does not satisfy $P=2^{\alpha_2} \cdot 3^{\alpha_3} \cdot 5^{\alpha_5}$, where $\alpha_2$, $\alpha_3$, $\alpha_5$ are nonnegative integers, the target resource is Q resource blocks, where Q is a largest integer that satisfies $Q=2^{\alpha_2} \cdot 3^{\alpha_3} \cdot 5^{\alpha_5}$ and Q<P, and $\alpha_2$, $\alpha_3$, $\alpha_5$ are nonnegative integers; and a receiver, configured to receive the uplink data sent by the UE on the target resource.

Further, the Q resource blocks are Q resource blocks whose resource block index values are the largest in the P resource blocks; or the Q resource blocks are Q resource blocks whose resource block index values are the smallest in the P resource blocks.

According to the data sending method, the data receiving method, the user equipment, and the base station that are provided in the embodiments of the present invention, a resource used by the UE for scheduling data transmission is allocated in the M basic resource elements in the N basic resource elements, and discrete resource blocks in the M basic resource elements are allocated to the UE, so that when maximum transmit power of the UE is limited by a requirement that a power spectral density should not be greater than an upper limit value, allowed maximum transmit power of the UE can be increased, thereby significantly improving service coverage of the base station.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show some embodiments of the present invention, and a person of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The technical solutions in the embodiments of the present invention may be applied to various communications systems in a wireless cellular network, such as: a Global System for Mobile Communications (GSM), a Code Division Multiple Access (CDMA) system, a Wideband Code Division Multiple Access (WCDMA) system, a General Packet Radio Service (GPRS) system, an LTE system, and a Universal Mobile Telecommunications System (UMTS). This is not limited in the embodiments of the present invention.

The technical solutions in the embodiments of the present invention are mainly applied to an LTE system, and particularly, to a licensed-assisted access (LAA) system for sending uplink data on an unlicensed spectrum resource. In a communications system to which the embodiments of the present invention are applied, network elements that are used are a base station (also referred to as an access network device) and user equipment (UE).

A data sending method and apparatus provided in the embodiments of the present invention are applied to a scenario in which a limitation condition that a power spectral density should not be greater than an upper limit value exists when UE sends data on an unlicensed spectrum resource. In the embodiments of the present invention, a target resource allocated to UE to send data is distributed in M basic resource elements in N basic resource elements on an uplink carrier. Discrete resource blocks in the M basic resource elements are allocated to the UE, so that when maximum transmit power of the UE is limited by a requirement that a power spectral density should not be greater than an upper limit value, allowed maximum transmit power of the UE can be increased, thereby significantly improving service coverage of a base station. The technical solutions provided in the embodiments of the present invention are described below in detail with reference to the accompanying drawings.

A "basic resource element" described in the embodiments of the present invention is a resource element including V resource blocks (RB), where V is greater than or equal to 1.

Figure 1:
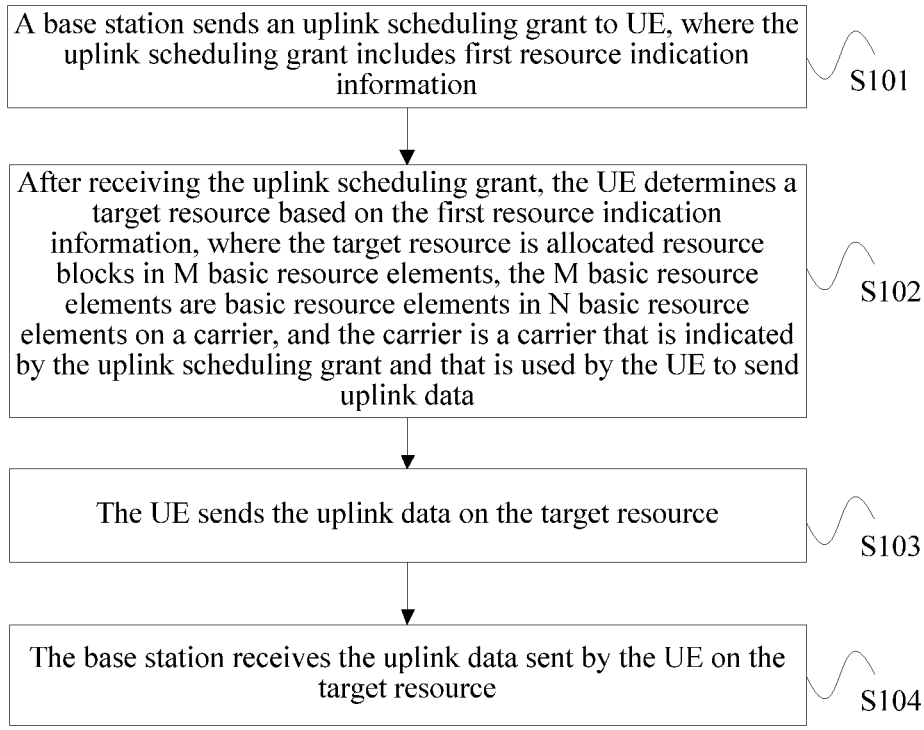
FIG. 1 is a schematic flowchart of Embodiment 1 of a data sending method according to the present invention.

FIG. 1 is a schematic flowchart of Embodiment 1 of a data sending method according to the present invention. As shown in FIG. 1, the method includes the following steps.

S101: A base station sends an uplink scheduling grant to UE, where the uplink scheduling grant includes first resource indication information.

S102: After receiving the uplink scheduling grant, the UE determines a target resource based on the first resource indication information, where the target resource is allocated resource blocks in M basic resource elements, the M basic resource elements are basic resource elements in N basic resource elements on a carrier, the carrier is a carrier that is indicated by the uplink scheduling grant and that is used by the UE to send uplink data, each basic resource element includes at least one resource block, M and N are natural numbers, and M is not greater than N.

S103: The UE sends the uplink data on the target resource.

S104: The base station receives the uplink data sent by the UE on the target resource.

Specifically, the base station may configure one or more carriers for the UE to send the uplink data. On each configured carrier, a resource for sending the uplink data by the UE is a resource indicated by information included in the uplink scheduling grant of the base station. Specifically, the uplink scheduling grant may be control information sent by the base station to the UE by using a physical downlink control channel (PDCCH) or an enhanced physical downlink control channel (EPDCCH). In addition, the uplink scheduling grant is indication information for instructing the UE to send data on one of the carriers configured for the UE.

The carrier that is indicated by the uplink scheduling grant and that is used by the UE to send the uplink data includes $N_{RB}^{UL}$ resource blocks. The base station and the UE use a preset rule, to divide the $N_{RB}^{UL}$ resource blocks into the N basic resource elements. Each basic resource element includes at least one resource block, and a division principle is to ensure, as much as possible, that each basic resource element includes a same quantity of resource blocks. If it cannot be ensured that each basic resource element includes a same quantity of resource blocks, R basic resource elements may include a same quantity of resource blocks, and a quantity of resource blocks included in remaining N-R basic resource elements is less than the quantity of resource blocks included in the R basic resource elements. For example, if a quantity $P_1$ of resource blocks included in one basic resource element is $P_1$=10, and a total quantity of resource blocks included in the carrier used by the UE to send the uplink data is $N_{RB}^{UL}$=75, a quantity of basic resource elements included in the carrier after the carrier is divided is $$K = \left\lceil \frac{N_{RB}^{UL}}{P_1} \right\rceil = 8.$$

A quantity of resource blocks included in each of seven basic resource elements is 10, and a quantity of resource blocks included in one basic resource element is 5. That is, both the base station and the UE may determine, by using a preset basic resource element division manner, that the $N_{RB}^{UL}$ resource blocks of the carrier include the N basic resource elements, and may determine a quantity and location of resource blocks included in each of the N basic resource elements.

When allocating, to UE, a target resource of resource blocks used to send uplink data, the base station determines that the target resource is resource blocks in M basic resource elements in the N basic resource elements (instead of resource blocks in other N-M basic resource elements). When determining the allocated target resource, the UE first determines a location of the M basic resource elements.

After determining that the target resource allocated to the UE is the resource blocks in the M basic resource elements, the base station determines which resource blocks in the M basic resource elements are the target resource allocated to the UE, and sends, to the UE by using the first resource indication information, location information of the determined resource blocks that are in the M basic resource elements and that are the target resource. The UE determines the target resource by using the first resource indication information.

After determining the target resource, the UE sends the uplink data on the target resource. The base station receives the data sent by the UE on the target resource.

According to the resource allocation method in this embodiment, a resource used by the UE for scheduling data transmission is allocated in the M basic resource elements in the N basic resource elements, and discrete resource blocks in the M basic resource elements are allocated to the UE, so that when maximum transmit power of the UE is limited by a requirement that a power spectral density should not be greater than an upper limit value, allowed maximum transmit power of the UE can be increased, and a coverage characteristic of the base station can be improved. For example, if the transmit power of the UE needs to be not greater than 10 dBm in any 1 MHz, when a resource of three resource blocks is allocated to the UE to send the uplink data, according to a resource-block-based resource allocation type in the prior art, the transmit power of the UE cannot exceed 10 dBm. However, if the foregoing basic-resource-element-based resource allocation manner provided in this embodiment of the present invention is used to evenly distribute the resource of the three RBs on three basic resource elements, and a distance between the three basic resource elements is greater than 1 MHz, the transmit power of the UE may be maximally 16 dBm, so that service coverage of the base station is significantly improved.

The base station determines that the target resource allocated to the UE to send the uplink data is the resource blocks in the M basic resource elements in the N basic resource elements. The following two methods are used as examples of a method for determining a location of the M basic resource elements by the base station and the UE. It should be noted that the two methods are merely examples, and do not limit the protection scope of the present invention.

In a first method, the base station and the UE determine the location of the M basic resource elements in the N basic resource elements by using a preset rule. For example, the preset rule of the base station and the UE is that the M basic resource elements are all the N basic resource elements. Alternatively, the preset rule of the base station and the UE is that in a first-type uplink subframe, the M basic resource elements are all basic resource elements sequentially numbered odd numbers in the N basic resource elements, and in a second-type uplink subframe, the M basic resource elements are all basic resource elements sequentially numbered even numbers in the N basic resource elements. The first-type uplink subframe is a subframe numbered an odd number, and the second-type uplink subframe is a subframe numbered an even number. That is, the base station and the UE may separately determine the location of the M basic resource elements in the N basic resource elements by using the preset rule, and the base station does not need to notify the UE of the location information by using explicit signaling.

In a second method, the base station sends second resource indication information to the UE, where the second resource indication information is used to indicate location information of the M basic resource elements in the N basic resource elements to the UE. The UE receives the second resource indication information, to determine a location of the M basic resource elements in the N basic resource elements. The second resource indication information may be sent to the UE before or after the base station sends the uplink scheduling grant to the UE. Alternatively, the second resource indication information is indication information included in the uplink scheduling grant sent by the base station to the UE. For that the second resource indication information indicates the location information of the M basic resource elements in the N basic resource elements, there are the following three manners. It should be noted that the three manners are merely examples, and do not limit the protection scope of the present invention.

Figure 2:
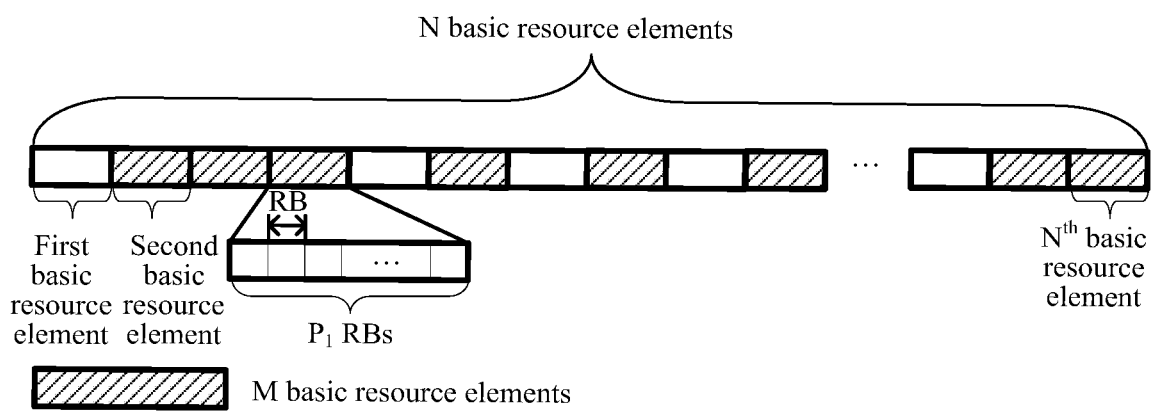
FIG. 2 is a schematic diagram of a location of M basic resource elements in N basic resource elements according to Embodiment 1 of the present invention.

(1) The second resource indication information indicates the location information of the M basic resource elements in the N basic resource elements from the base station to the UE by using a bitmap. For example, a length of the second resource indication information is N. FIG. 2 is a schematic diagram of a location of M basic resource elements in N basic resource elements according to Embodiment 1 of the present invention. As shown in FIG. 2, the N basic resource elements are sequentially numbered 1, 2, 3, . . . , and N. A value of each bit of the N-bit second resource indication information is 0 or 1, and correspondingly indicates whether each of the N basic resource elements belongs to the M basic resource elements. A value "1" indicates that a basic resource element corresponding to the bit belongs to the M basic resource elements, and a value "0" indicates that a basic resource element corresponding to the bit does not belong to the M basic resource elements. Preferably, a frequency difference between a lowest frequency occupied by the M basic resource elements and a highest frequency occupied by the M basic resource elements satisfies a condition that the frequency difference is not less than a first bandwidth threshold. The first bandwidth threshold is 80% of a frequency difference between a lowest frequency occupied by the N basic resource elements and a highest frequency occupied by the N basic resource elements. Preferably, the M basic resource elements are equispaced.

(2) The second resource indication information indicates a location of a start basic resource element and a location of an end basic resource element in the M basic resource elements from the base station to the UE. For example, a length of the second resource indication information is $$\left\lceil \log_2 \frac{N(N+1)}{2} \right\rceil.$$

Figure 3:
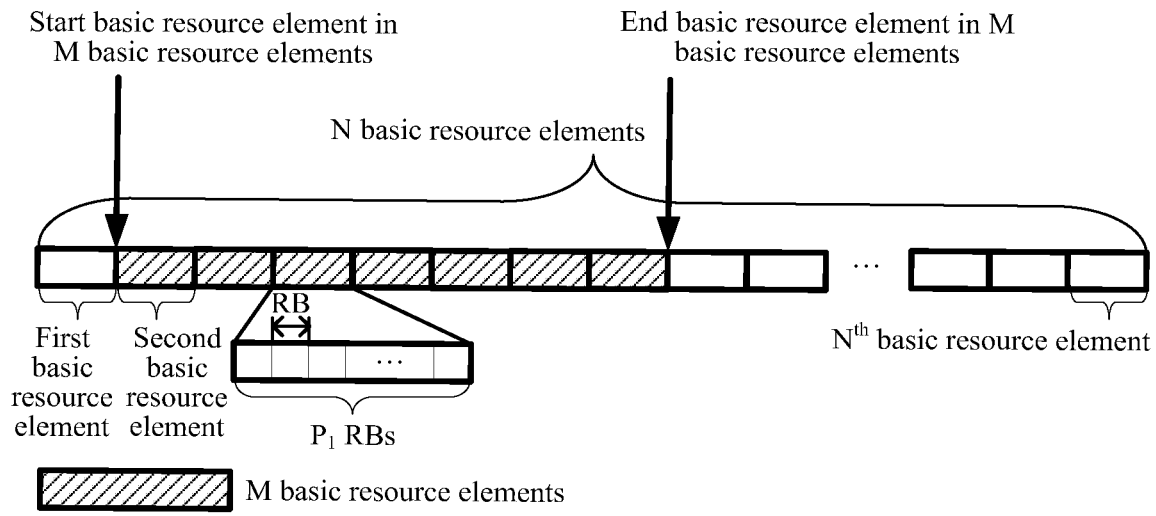
FIG. 3 is another schematic diagram of a location of M basic resource elements in N basic resource elements according to Embodiment 1 of the present invention.

FIG. 3 is another schematic diagram of a location of M basic resource elements in N basic resource elements according to Embodiment 1 of the present invention. As shown in FIG. 3, the N basic resource elements are sequentially numbered 1, 2, 3, . . . , and N. The UE may determine a location of a start basic resource element and a location of an end basic resource element in the M basic resource elements by using the $$\left\lceil \log_2 \frac{N(N+1)}{2} \right\rceil$$

-bit second indication information. In this manner, the M basic resource elements are consecutive basic resource elements in the N basic resource elements. For another example, a number of the start basic resource element and a number of the end basic resource element in the M basic resource elements are indicated from the base station to the UE. Preferably, a frequency difference between a lowest frequency occupied by the M basic resource elements and a highest frequency occupied by the M basic resource elements satisfies a condition that the frequency difference is not less than a first bandwidth threshold. The first bandwidth threshold is 80% of a frequency difference between a lowest frequency occupied by the N basic resource elements and a highest frequency occupied by the N basic resource elements. Preferably, the M basic resource elements are equispaced.

(3) The base station and the UE divide the N basic resource elements into P basic resource element groups in a preset manner. The base station and the UE determine a quantity and location of basic resource elements in each of the P basic resource element groups, where P>2. For example, if P=2, and the preset manner is that the N basic resource elements are sequentially numbered 0, 1, . . . , and N, a basic resource element in the first basic resource element group is a basic resource element numbered an odd number, and a basic resource element in the second basic resource element group is a basic resource element numbered an even number. The base station and the UE may separately determine the quantity and location of basic resource elements in each of the P basic resource element groups in the preset manner. Preferably, the basic resource elements included in each of the P basic resource element groups are equispaced.

Figure 4:
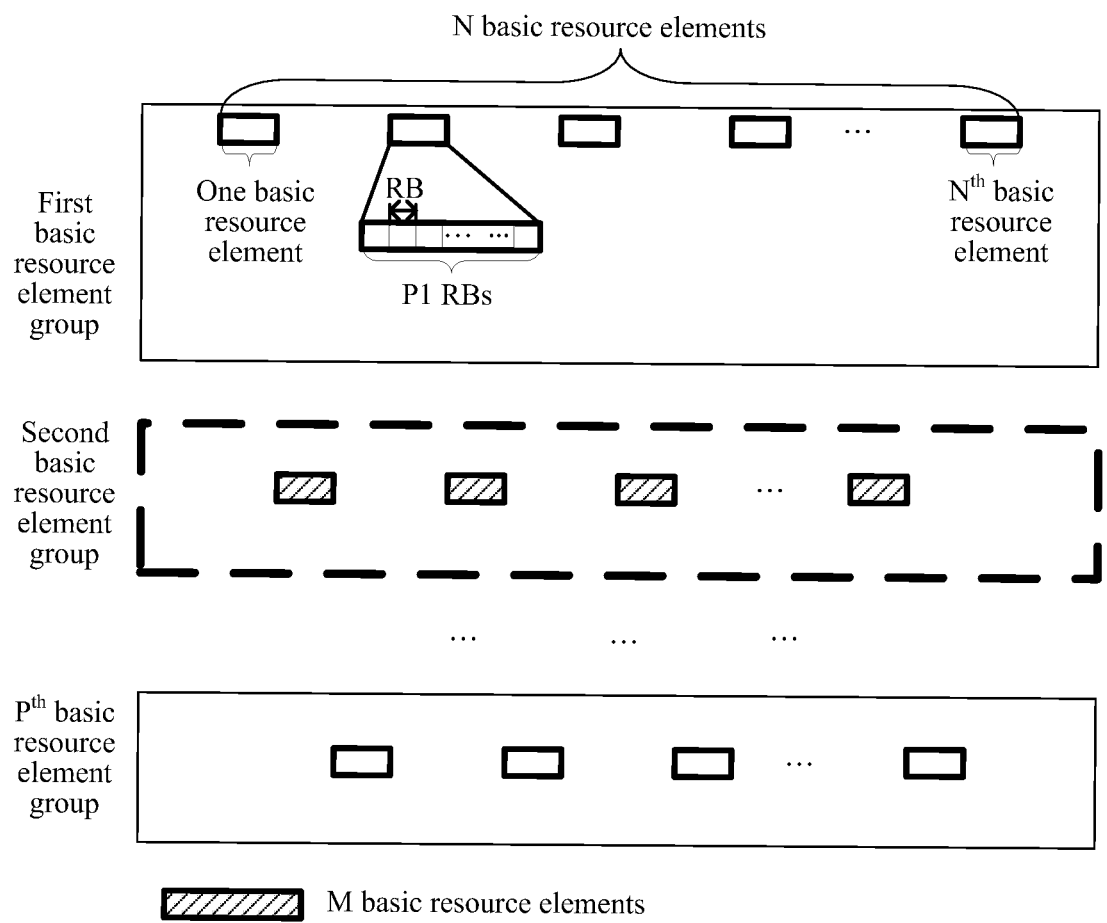
FIG. 4 is still another schematic diagram of a location of M basic resource elements in N basic resource elements according to Embodiment 1 of the present invention.

Further, the base station notifies the UE of location information of one of the P basic resource element groups by using the second resource indication information, and the M basic resource elements are all basic resource elements included in the one of the P basic resource element groups. For example, a length of the second resource indication information is $\lceil \log_2 P \rceil$, and is used by the base station to notify the UE of one group, of the P basic resource element groups, in which basic resource elements included are the M basic resource elements. Preferably, a frequency difference between a lowest frequency occupied by the M basic resource elements and a highest frequency occupied by the M basic resource elements satisfies a condition that the frequency difference is not less than a first bandwidth threshold. The first bandwidth threshold is 80% of a frequency difference between a lowest frequency occupied by the N basic resource elements and a highest frequency occupied by the N basic resource elements. Preferably, the M basic resource elements are equispaced. FIG. 4 is still another schematic diagram of a location of M basic resource elements in N basic resource elements according to Embodiment 1 of the present invention. As shown in FIG. 4, the second resource indication information is used to indicate that all basic resource elements included in the second basic resource element group are the M basic resource elements.

After determining that the target resource allocated to the UE is the resource blocks in the M basic resource elements, the base station determines which resource blocks in the M basic resource elements are the target resource allocated to the UE, and sends, to the UE by using the first resource indication information, location information of the determined resource blocks that are in the M basic resource elements and that are the target resource. The UE determines the target resource by using the first resource indication information. The following three methods are used as examples of indicating the allocated resource blocks in the M basic resource elements by using the first resource indication information. It should be noted that the three methods are merely examples, and do not limit the protection scope of the present invention.

Figure 5:
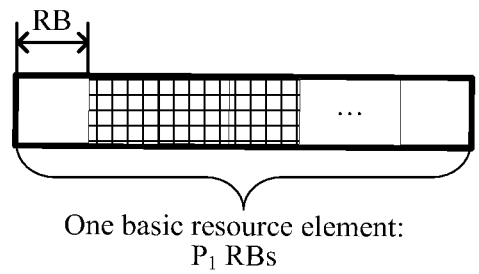
FIG. 5 is a schematic diagram of allocated resource blocks in one basic resource element that are indicated by first resource indication information according to an embodiment of the present invention.

In a first implementation, the first resource indication information sent by the base station to the UE indicates location information of allocated resource blocks in one basic resource element. Specifically, the first resource indication information may indicate that the allocated resource blocks in the one basic resource element are several consecutive resource blocks or several nonconsecutive resource blocks. Preferably, the allocated resource blocks in the one basic resource element are several consecutive resource blocks. Alternatively, the allocated resource blocks in the one basic resource element are several resource blocks whose distance is not less than a preset value. For example, the allocated resource blocks in the one basic resource element are the $l_1{}^{th}$ RB to the $l_2{}^{th}$ resource block in $P_1$ resource blocks, where $l_2 > l_1$, $l_2 - l_1 > \lambda$, and $\lambda$ is a preset value. For example, FIG. 5 is a schematic diagram of allocated resource blocks in one basic resource element that are indicated by first resource indication information according to an embodiment of the present invention. As shown in FIG. 5, a quantity of resource blocks in the one basic resource element is $P_1$, and the first resource indication information indicates the second, the third, and the fourth resource blocks in the one basic resource element.

Figure 6:
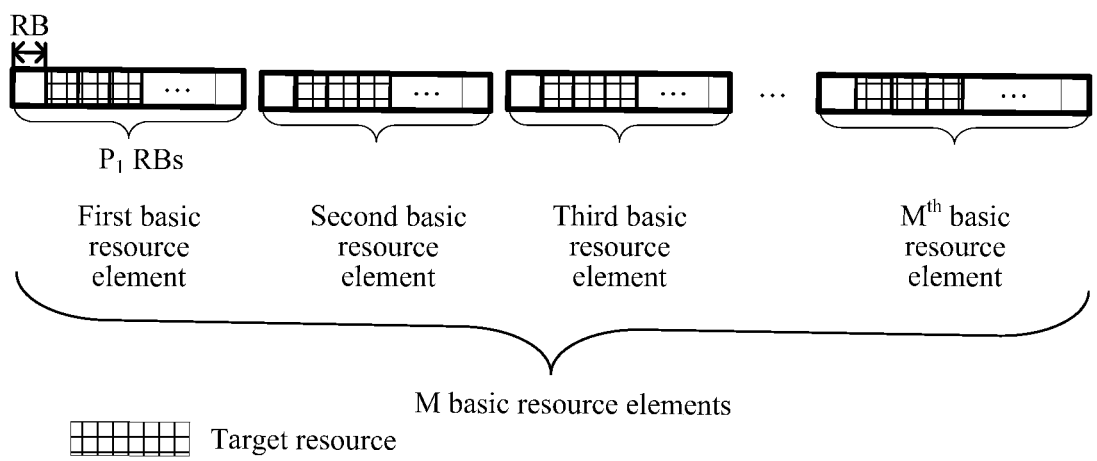
FIG. 6 is a schematic diagram of a target resource determined by UE based on first resource indication information in Embodiment 1 of a data sending method according to the present invention.

After receiving the first resource indication information, the UE determines allocated resource blocks in each of the M basic resource elements based on the first resource indication information, and combines the allocated resource blocks into the target resource. Specifically, there are two cases:

(1) Each of the M basic resource elements includes a same quantity of resource blocks. In this case, the UE determines the allocated resource blocks in each of the M basic resource elements based on the location information that is of the allocated resource blocks in the one basic resource element and that is indicated in the first resource indication information, and combines the allocated resource blocks into the target resource. A location of the allocated resource blocks in each of the M basic resource elements is the same as a location indicated by the first resource indication information. For example, the quantity of resource blocks included in each of the M basic resource elements is $P_1$. After receiving the first resource indication information, the UE determines that each of the M basic resource elements has a same quantity of allocated resource blocks and the allocated resource blocks are resource blocks determined in each basic resource element based on the location information indicated in the first resource indication information. These resource blocks form the target resource. FIG. 6 is a schematic diagram of a target resource determined by UE based on first resource indication information in Embodiment 1 of a data sending method according to the present invention. As shown in FIG. 6, the second, the third, and the fourth resource blocks in each of the M basic resource elements form the target resource.

(2) R basic resource elements in the M basic resource elements include a same quantity of resource blocks, where the quantity is $P_1$, and a quantity of resource blocks included in each of remaining M-R basic resource elements is not equal to $P_1$. The UE determines allocated resource blocks in each of the R basic resource elements and an allocated resource block in each of the M-R basic resource elements based on the location information that is of the allocated resource blocks in the one basic resource element and that is indicated in the first resource indication information, and combines the allocated resource blocks into the target resource. A location of the allocated resource blocks in each of the R basic resource elements is the same as a location indicated by the first resource indication information, and the allocated resource block in each of the M-R basic resource elements is a resource block, in the basic resource element, that is corresponding to the location information indicated in the first resource indication information.

Figure 7:
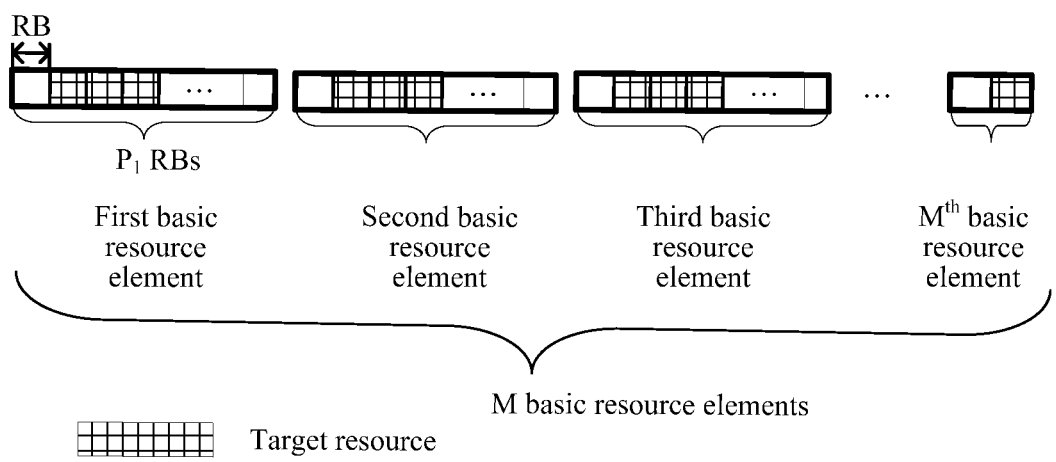
FIG. 7 is another schematic diagram of a target resource determined by UE based on first resource indication information in Embodiment 1 of a data sending method according to the present invention.

For example, M−1 basic resource elements in the M basic resource elements each includes $P_1$ resource blocks, and another basic resource element in the M basic resource elements includes two resource blocks, where $P_1>2$. After receiving the first resource indication information, the UE determines that each of the M−1 basic resource elements has a same quantity of allocated resource blocks, and the allocated resource blocks are resource blocks determined in each basic resource element based on the location information indicated in the first resource indication information. The UE further determines, based on the first resource indication information, that an allocated resource block in the another basic resource element in which a quantity of resource blocks included is not equal to $P_1$ is a resource block, in the basic resource element, that is corresponding to the location information indicated in the first resource indication information. Specifically, the basic resource element in which the quantity of resource blocks included is not equal to $P_1$ includes only two resource blocks, and the location information that is of the resource blocks in the one basic resource element and that is indicated in the first resource indication information is the second, the third, and the fourth resource blocks. Therefore, the UE determines that the allocated resource block in the basic resource element is the second resource block in the basic resource element. The second resource block indicated in the first resource indication information is a resource block existing in the basic resource element, and the third and the fourth resource blocks indicated in the first resource indication information are resource blocks not existing in the basic resource element. FIG. 7 is another schematic diagram of a target resource determined by UE based on first resource indication information in Embodiment 1 of a data sending method according to the present invention. As shown in FIG. 7, it is assumed that R=1. The UE combines the determined allocated resource blocks in each of the M−1 basic resource elements and the determined allocated resource blocks in the one basic resource element into the target resource.

In a second implementation, the first resource indication information is used to indicate location information of L basic resource elements in the M basic resource elements. The UE determines a location of the L basic resource elements based on the first resource indication information, and the UE determines all resource blocks included in the L basic resource elements, and combines the resource blocks into the target resource. That is, a resource allocated by the base station to the UE is allocated by using a basic resource element as a granularity. The base station sends, to the UE by using the first resource indication information, information about basic resource elements in the M basic resource elements that are allocated to the UE. After receiving the first resource indication information, the UE determines all resource blocks included in each of the allocated basic resource elements, and combines the resource blocks into the target resource.

Specifically, the first resource indication information may indicate a location of L consecutive basic resource elements in the M basic resource elements that is used by the UE to determine the target resource. Alternatively, the first resource indication information may indicate a location of L nonconsecutive basic resource elements in the M basic resource elements that is used by the UE to determine the target resource. This is not limited in the present invention.

Figure 8:
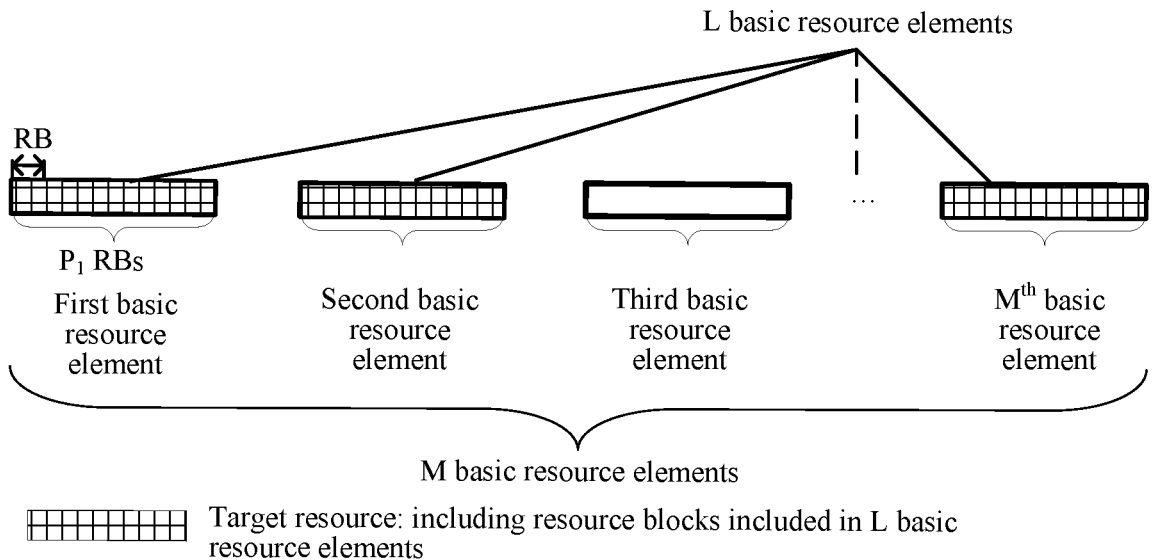
FIG. 8 is still another schematic diagram of a target resource determined by UE based on first resource indication information in Embodiment 1 of a data sending method according to the present invention.

Specifically, the L basic resource elements may include a same quantity of resource blocks or different quantities of resource blocks. FIG. 8 is still another schematic diagram of a target resource determined by UE based on first resource indication information in Embodiment 1 of a data sending method according to the present invention. As shown in FIG. 8, a quantity of resource blocks included in each of M basic resource elements is $P_1$, and the UE determines all resource blocks included in L basic resource elements, and combines the resource blocks into the target resource.

Figure 9:
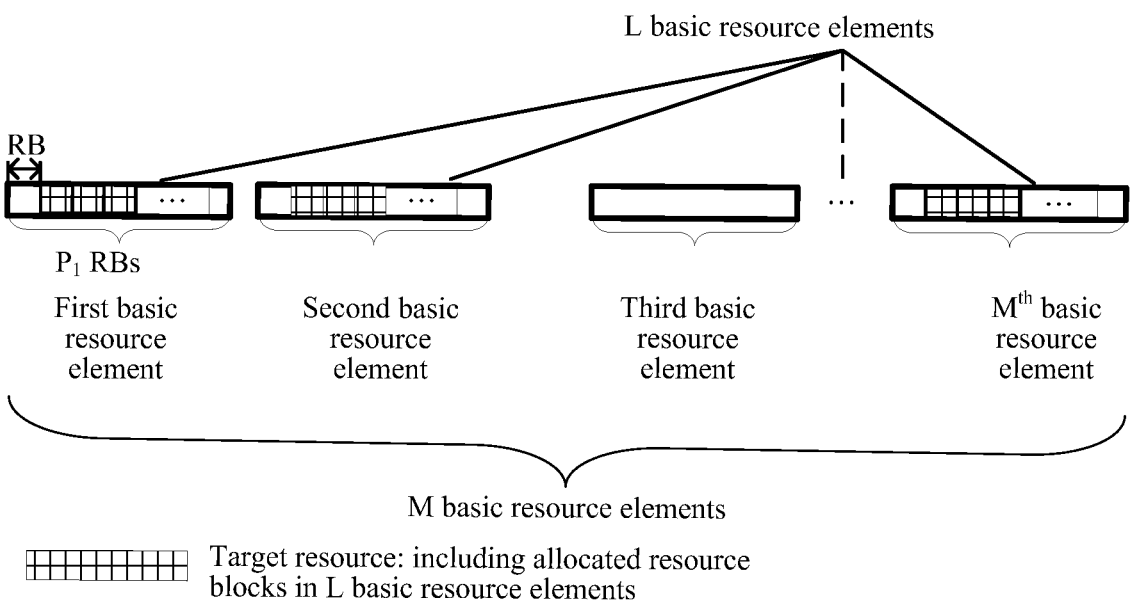
FIG. 9 is yet another schematic diagram of a target resource determined by UE based on first resource indication information in Embodiment 1 of a data sending method according to the present invention.

In a third implementation, the first resource indication information sent by the base station to the UE is used to indicate location information of L basic resource elements in the M basic resource elements and location information of allocated resource blocks in one of the L basic resource elements. After receiving the first resource indication information, the UE determines a location of the L basic resource elements based on the location information of the L basic resource elements that is indicated in the first resource indication information, determines allocated resource blocks in each of the L basic resource elements based on the location information that is of the allocated resource blocks in the one basic resource element and that is indicated in the first resource indication information, and combines the allocated resource blocks into the target resource. Specifically, the first resource indication information may indicate that the allocated resource blocks in the one basic resource element are several consecutive resource blocks or several nonconsecutive resource blocks. This is not limited in the present invention. For example, FIG. 9 is yet another schematic diagram of a target resource determined by UE based on first resource indication information in Embodiment 1 of a data sending method according to the present invention. The first resource indication information indicates the second, the third, and the fourth resource blocks in one basic resource element. As shown in FIG. 9, the target resource includes the second, the third, and the fourth resource blocks in each of the L basic resource elements in the M basic resource elements.

In this implementation, the L basic resource elements may include a same quantity of resource blocks or different quantities of resource blocks. Correspondingly, after the UE receives the first resource indication information, there are the following two manners of determining the target resource:

(1) Each of the L basic resource elements includes a same quantity of resource blocks. The UE determines the allocated resource blocks in each of the L basic resource elements based on the location information that is of the allocated resource blocks in the one basic resource element and that is indicated in the first resource indication information, and combines the allocated resource blocks into the target resource.

(2) G basic resource elements in the L basic resource elements include a same quantity of resource blocks, where the quantity is $P_1$, and a quantity of resource blocks included in each of remaining L-G basic resource elements is not equal to $P_1$. The UE determines allocated resource blocks in each of the G basic resource elements and an allocated resource block in each of the L-G basic resource elements based on the location information that is of the allocated resource blocks in the one basic resource element and that is indicated in the first resource indication information, and combines the allocated resource blocks into the target resource. The allocated resource block in each of the L-G basic resource elements is a resource block, in the basic resource element, that is corresponding to the location information indicated in the first resource indication information.

According to the methods in this embodiment, a resource used by the UE for scheduling data transmission is allocated in the M basic resource elements in the N basic resource elements, and discrete resource blocks in the M basic resource elements are allocated to the UE, so that when maximum transmit power of the UE is limited by a requirement that a power spectral density should not be greater than an upper limit value, allowed maximum transmit power of the UE can be increased, and service coverage of the base station can be improved.

Further, some of the foregoing specific implementations of the basic-resource-element-based resource allocation type do not support allocating all resources on the carrier to the UE. For example, when the quantity of resource blocks included in each basic resource element is greater than 1 and M<N, the target resource allocated to the UE to send the uplink data is certainly less than all resource blocks on the carrier. When the limitation that the power spectral density should not be greater than the upper limit value is not imposed on the maximum uplink transmit power of the UE, resource blocks on an uplink carrier cannot be massively or all allocated to the UE by using the basic-resource-element-based resource allocation type, restricting flexibility of resource allocation.

Therefore, the following optional steps are introduced in this embodiment of the present invention, so as to improve the flexibility of resource allocation when the basic-resource-element-based resource allocation type is used on the carrier.

Further, before allocating the target resource to the UE based on the foregoing resource allocation type method (the basic-resource-element-based resource allocation type), the base station further determines whether a resource allocation type of the UE on the carrier is a basic-resource-element-based resource allocation type or a resource-block-based resource allocation type. The resource-block-based resource allocation type includes a first resource-block-based resource allocation type and/or a second resource-block-based resource allocation type. If it is determined that the resource allocation type of the UE on the carrier is a basic-resource-element-based resource allocation type, the target resource is allocated to the UE by using the foregoing method; if the resource allocation type of the UE on the carrier is a first resource-block-based resource allocation type, the base station notifies the UE of a location of a start resource block and a location of an end resource block in the allocated target resource by using resource allocation indication information in the uplink scheduling grant, and the target resource includes the start resource block, the end resource block, and all resource blocks between the start resource block and the end resource block; and/or, if it is determined that the resource allocation type of the UE on the carrier is a second resource-block-based resource allocation type, the base station notifies the UE of a location of a first start resource block, a location of a first end resource block, a location of a second start resource block, and a location of a second end resource block in the target resource by using resource allocation indication information in the uplink scheduling grant, and the target resource includes the first start resource block, the first end resource block, all resource blocks between the first start resource block and the first end resource block, the second start resource block, the second end resource block, and all resource blocks between the second start resource block and the second end resource block.

Optionally, if determining that the carrier is a carrier on an unlicensed spectrum, the base station determines that the resource allocation type of the UE on the carrier is a basic-resource-element-based resource allocation type.

Optionally, after determining whether the resource allocation type of the UE on the carrier is a basic-resource-element-based resource allocation type or a resource-block-based resource allocation type, the base station sends the determining result to the UE by using third resource indication information. The resource-block-based resource allocation type includes the first resource-block-based resource allocation type and/or the second resource-block-based resource allocation type. The third resource indication information may be sent to the UE by using indication information in higher layer signaling or by using information in the uplink scheduling grant.

Correspondingly, before determining the target resource based on the foregoing resource allocation type method and the first resource indication information, the UE also needs to determine whether a resource allocation type on the carrier used by the UE to send the uplink data is a basic-resource-element-based resource allocation type or a resource-block-based resource allocation type. The resource-block-based resource allocation type includes a first resource-block-based resource allocation type and/or a second resource-block-based resource allocation type. Specifically, when the carrier is a carrier on an unlicensed spectrum, it may be determined that the resource allocation type on the carrier is a basic-resource-element-based resource allocation type. Alternatively, the resource allocation type on the carrier may be determined based on received third resource indication information that is sent by the base station by using information in higher layer signaling or information in the uplink scheduling grant. When the resource allocation type determined by the UE is a basic-resource-element-based resource allocation type, the UE determines the target resource based on the first resource indication information, and sends the uplink data on the target resource; when the resource allocation type determined by the UE is a first resource-block-based resource allocation type, the UE determines a location of a start resource block and a location of an end resource block in the allocated resource on the carrier based on resource allocation indication information in the uplink scheduling grant, and sends the uplink data on the start resource block, the end resource block, and all resource blocks between the start resource block and the end resource block; and/or, if the resource allocation type of the UE on the carrier is a second resource-block-based resource allocation type, the UE determines a location of a first start resource block, a location of a first end resource block, a location of a second start resource block, and a location of a second end resource block in the allocated resource on the carrier based on resource allocation indication information in the uplink scheduling grant, and sends the uplink data on the target resource including the first start resource block, the first end resource block, all resource blocks between the first start resource block and the first end resource block, the second start resource block, the second end resource block, and all resource blocks between the second start resource block and the second end resource block.

The foregoing basic-resource-element-based resource allocation type is a resource allocation type not supporting allocating all the resources on the carrier to the UE, and the first resource-block-based resource allocation type and the second resource-block-based resource allocation type support allocating all the resources on the carrier to the UE.

According to this step, when the limitation that the power spectral density should not be greater than the upper limit value is not imposed on the maximum uplink transmit power of the UE, the resource-block-based resource allocation type is used for the target resource allocated to the UE to send the uplink data, so as to support allocating all the resource blocks on the carrier to the UE. When the maximum uplink transmit power of the UE is limited by a requirement that the power spectral density should not be greater than the upper limit value, the basic-resource-element-based resource allocation type is used for the target resource allocated to the UE to send the uplink data, so as to improve a service range of an LAA SCell and improve the flexibility of the resource allocation.

Usually, UE in LTE supports only discrete Fourier transform (DFT) whose quantity of points is Y, where $Y=2^{\alpha_2} \cdot 3^{\alpha_3} \cdot 5^{\alpha_5}$, and $\alpha_2, \alpha_3, \alpha_5$ are nonnegative integers. For the basic-resource-element-based resource allocation type, if a quantity of allocated resource blocks that is indicated by the first resource indication information is P, and a value of P may not satisfy $P=2^{\alpha_2} \cdot 3^{\alpha_3} \cdot 5^{\alpha_5}$, where $\alpha_2, \alpha_3, \alpha_5$ are nonnegative integers, and if the UE sends data on the resource of the P resource blocks and performs, on the to-be-sent data, DFT of a length being a value of a quantity of subcarriers occupied by the P resource blocks in frequency domain, implementation complexity of the UE is increased. To resolve this problem, after the UE determines that a quantity of resource blocks included in the target resource determined according to S102 is P, and before the UE sends the uplink data on the target resource in S103, the method may further include: determining, by the UE, whether P satisfies $P=2^{\alpha_2} \cdot 3^{\alpha_3} \cdot 5^{\alpha_5}$, where $\alpha_2, \alpha_3, \alpha_5$ are nonnegative integers.

If P satisfies $P=2^{\alpha_2} \cdot 3^{\alpha_3} \cdot 5^{\alpha_5}$, where $\alpha_2, \alpha_3, \alpha_5$ are nonnegative integers, the UE sends the uplink data on the target resource including the P resource blocks.

If P does not satisfy $P=2^{\alpha_2} \cdot 3^{\alpha_3} \cdot 5^{\alpha_5}$, where $\alpha_2, \alpha_3, \alpha_5$ are nonnegative integers, the UE determines that the target resource is Q resource blocks in the P resource blocks, and the UE sends the uplink data on the target resource including the Q resource blocks. Q is a largest integer that satisfies $Q=2^{\alpha_2} \cdot 3^{\alpha_3} \cdot 5^{\alpha_5}$ and Q<P, where $\alpha_2, \alpha_3, \alpha_5$ are nonnegative integers.

The Q resource blocks are resource blocks determined in the P resource blocks according to a preset rule. For example, the Q resource blocks are Q resource blocks whose resource block index values are the largest in the P resource blocks, or the Q resource blocks are Q resource blocks whose resource block index values are the smallest in the P resource blocks.

According to this method, when the basic-resource-element-based resource allocation type is used, if the quantity of allocated resource blocks that is indicated by the first resource indication information is P, and P does not satisfy $P=2^{\alpha_2} \cdot 3^{\alpha_3} \cdot 5^{\alpha_5}$, where $\alpha_2, \alpha_3, \alpha_5$ are nonnegative integers, both the base station and the UE may determine the Q resource blocks in the resource of the P resource blocks by using a preset method, where Q satisfies $Q=2^{\alpha_2} \cdot 3^{\alpha_3} \cdot 5^{\alpha_5}$, and $\alpha_2, \alpha_3, \alpha_5$ are nonnegative integers. The UE sends the data on the resource of the Q resource blocks, and performs, on the to-be-sent data, DFT of a length being a value of a quantity of subcarriers occupied by the Q resource blocks in frequency domain, thereby not increasing the implementation complexity of the UE.

For example, if the carrier for sending the data by the UE includes 100 resource blocks, in the basic-resource-element-based resource allocation type, one basic resource element includes 10 resource blocks (N=10). The UE determines the M basic resource elements based on the second resource indication information sent by the base station, where M=4, and determines, based on the first resource indication information sent by the base station, that the location of the allocated resource blocks in the one basic resource element is the first to the seventh resource blocks, that is, a size X of the allocated resource blocks in the one basic resource element is 7. The quantity of resource blocks included in the target resource determined by the UE based on the first resource indication information is 4×7=28, which does not satisfy $28=2^{\alpha_2} \cdot 3^{\alpha_3} \cdot 5^{\alpha_5}$, where $\alpha_2, \alpha_3, \alpha_5$ are nonnegative integers. When the UE sends the data on the target resource, if DFT of a length being a quantity of subcarriers occupied by 28 resource blocks needs to be performed on the data, implementation complexity is relatively high. In this case, it may be re-determined that resource blocks in three basic resource elements included in the target resource are respectively allocated resource blocks in the three basic resource elements. A quantity of resource blocks that are in the three basic resource elements and that belong to the target resource is 3×7=21. In addition, a quantity Q of resource blocks in the fourth basic resource element included in the target resource is 6, because Q=6 is a largest integer satisfying $3 \times 7+Q=2^{\alpha_2} \cdot 3^{\alpha_3} \cdot 5^{\alpha_5}$, where $\alpha_2, \alpha_3, \alpha_5$ are nonnegative integers.

For another resource allocation manner, if the quantity P of the allocated resource blocks that is notified by the base station by using the information in the uplink scheduling grant does not satisfy $P=2^{\alpha_2} \cdot 3^{\alpha_3} \cdot 5^{\alpha_5}$, where $\alpha_2, \alpha_3, \alpha_5$ are nonnegative integers, the foregoing method is also applicable, so as to resolve a problem of high implementation complexity when the UE sends the data on the P resource blocks. A specific embodiment is used below for detailed description.

Figure 10:
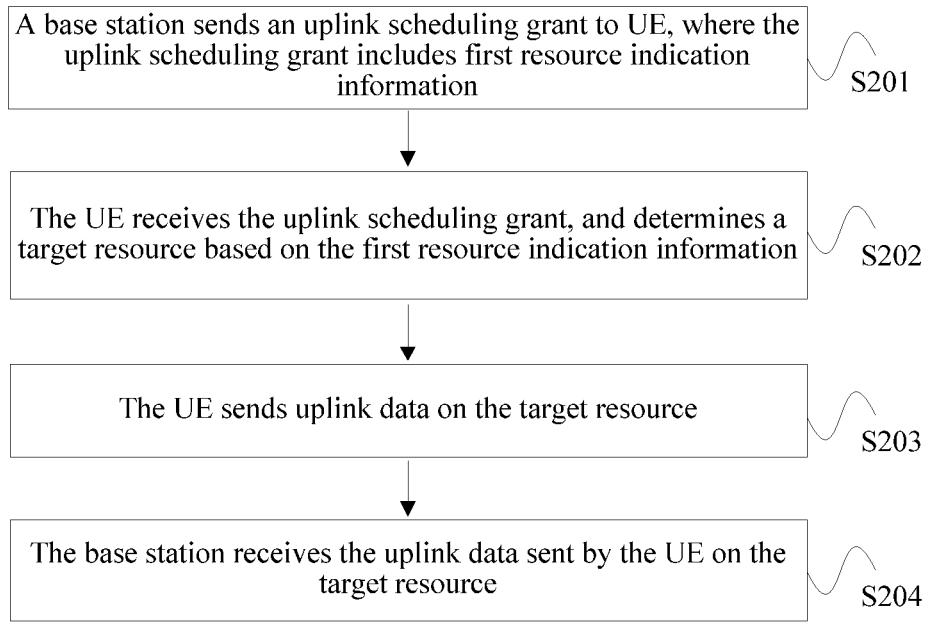
FIG. 10 is a schematic flowchart of Embodiment 2 of a data sending method according to the present invention.

FIG. 10 is a schematic flowchart of Embodiment 2 of a data sending method according to the present invention. As shown in FIG. 10, the method includes the following steps.

S201: A base station sends an uplink scheduling grant to UE, where the uplink scheduling grant includes first resource indication information.

S202: The UE receives the uplink scheduling grant, and determines a target resource based on the first resource indication information.

A resource indicated by the first resource indication information includes P resource blocks, the P resource blocks are resource blocks on a carrier, and the carrier is a carrier that is indicated by the uplink scheduling grant and that is used by the UE to send uplink data.

If P satisfies $P=2^{\alpha_2} \cdot 3^{\alpha_3} \cdot 5^{\alpha_5}$, where $\alpha_2$, $\alpha_3$, $\alpha_5$ are nonnegative integers, the target resource is the P resource blocks. If P does not satisfy $P=2^{\alpha_2} \cdot 3^{\alpha_3} \cdot 5^{\alpha_5}$, where $\alpha_2$, $\alpha_3$, $\alpha_5$ are nonnegative integers, the target resource is Q resource blocks, where Q is a largest integer that satisfies $Q=2^{\alpha_2} \cdot 3^{\alpha_3} \cdot 5^{\alpha_5}$ and Q<P, and $\alpha_2$, $\alpha_3$, $\alpha_5$ are nonnegative integers. This manner of determining the target resource is preset by using the base station and the UE.

S203: The UE sends uplink data on the target resource.

S204: The base station receives the uplink data sent by the UE on the target resource.

Optionally, the Q resource blocks are Q resource blocks whose resource block index values are the largest in the P resource blocks, or the Q resource blocks are Q resource blocks whose resource block index values are the smallest in the P resource blocks.

In this embodiment, the UE determines the target resource based on the first resource indication information. If a quantity of allocated resource blocks that is indicated by the first resource indication information is P, and P does not satisfy $P=2^{\alpha_2} \cdot 3^{\alpha_3} \cdot 5^{\alpha_5}$, where $\alpha_2$, $\alpha_3$, $\alpha_5$ are nonnegative integers, both the base station and the UE determine the Q resource blocks in the resource of the P resource blocks by using a preset method, where Q satisfies $Q=2^{\alpha_2} \cdot 3^{\alpha_3} \cdot 5^{\alpha_5}$, and $\alpha_2$, $\alpha_3$, $\alpha_5$ are nonnegative integers. The UE sends the data on a resource of the Q resource blocks, and performs, on the to-be-sent data, DFT of a length being a value of a quantity of subcarriers occupied by the Q resource blocks in frequency domain, thereby not increasing implementation complexity of the UE. Otherwise, the UE sends the data on the resource of the P resource blocks. This avoids quite high implementation complexity due to that DFT needs to be performed on the data when the UE sends the data on the target resource.

Figure 11:
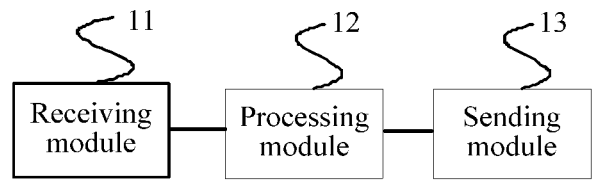
FIG. 11 is a schematic structural diagram of Embodiment 1 of user equipment according to the present invention.

FIG. 11 is a schematic structural diagram of Embodiment 1 of user equipment according to the present invention. As shown in FIG. 11, the user equipment includes: a receiving module 11, a processing module 12, and a sending module 13. The receiving module 11 is configured to receive an uplink scheduling grant, where the uplink scheduling grant includes first resource indication information. The processing module 12 is configured to determine a target resource based on the first resource indication information, where the target resource is allocated resource blocks in M basic resource elements, the M basic resource elements are basic resource elements in N basic resource elements on a carrier, the carrier is a carrier that is indicated by the uplink scheduling grant and that is used by the UE to send uplink data, each basic resource element includes at least one resource block, M and N are natural numbers, and M is not greater than N. The sending module 13 is configured to send the uplink data on the target resource.

The M basic resource elements are M preset basic resource elements in the N basic resource elements. Alternatively, the receiving module 11 is further configured to receive second resource indication information, where the second resource indication information is used to indicate location information of the M basic resource elements in the N basic resource elements. The processing module 12 is further configured to determine a location of the M basic resource elements based on the second resource indication information.

Further, the N basic resource elements are divided into P basic resource element groups, and each of the P basic resource element groups includes at least one basic resource element. The second resource indication information is used to indicate location information of the M basic resource elements in one of the P basic resource element groups.

Optionally, the first resource indication information is used to indicate location information of allocated resource blocks in one basic resource element. The processing module 12 is specifically configured to: determine allocated resource blocks in each of the M basic resource elements based on the location information that is of the allocated resource blocks in the one basic resource element and that is indicated in the first resource indication information, and combine the allocated resource blocks into the target resource.

When each of the M basic resource elements includes a same quantity of resource blocks, the processing module 12 determines the allocated resource blocks in each of the M basic resource elements based on the location information that is of the allocated resource blocks in the one basic resource element and that is indicated in the first resource indication information, and combines the allocated resource blocks into the target resource, where a location of the allocated resource blocks in each of the M basic resource elements is the same as a location indicated by the first resource indication information. Alternatively, when R basic resource elements in the M basic resource elements include a same quantity of resource blocks, where the quantity is $P_1$, and a quantity of resource blocks included in each of remaining M-R basic resource elements is not equal to $P_1$, the processing module 12 determines allocated resource blocks in each of the R basic resource elements and an allocated resource block in each of the M-R basic resource elements based on the location information that is of the allocated resource blocks in the one basic resource element and that is indicated in the first resource indication information, and combines the allocated resource blocks into the target resource, where a location of the allocated resource blocks in each of the R basic resource elements is the same as a location indicated by the first resource indication information, and the allocated resource block in each of the M-R basic resource elements is a resource block, in the basic resource element, that is corresponding to the location information indicated in the first resource indication information.

Optionally, the first resource indication information is used to indicate location information of L basic resource elements in the M basic resource elements. The processing module 12 is specifically configured to: determine a location of the L basic resource elements based on the first resource indication information, determine all resource blocks included in the L basic resource elements, and combine the resource blocks into the target resource.

Optionally, the first resource indication information is used to indicate location information of L basic resource elements in the M basic resource elements and location information of allocated resource blocks in one of the L basic resource elements. The processing module 12 is specifically configured to: determine a location of the L basic resource elements based on the location information of the L basic resource elements that is indicated in the first resource indication information, determine allocated resource blocks in each of the L basic resource elements based on the location information that is of the allocated resource blocks in the one basic resource element and that is indicated in the first resource indication information, and combine the allocated resource blocks into the target resource.

When each of the L basic resource elements includes a same quantity of resource blocks, the processing module 12 determines the allocated resource blocks in each of the L basic resource elements based on the location information that is of the allocated resource blocks in the one basic resource element and that is indicated in the first resource indication information, and combines the allocated resource blocks into the target resource, where a location of the allocated resource blocks in each of the L basic resource elements is the same as a location indicated by the first resource indication information. Alternatively, when R basic resource elements in the L basic resource elements include a same quantity of resource blocks, where the quantity is $P_1$, and a quantity of resource blocks included in each of remaining L-R basic resource elements is not equal to $P_1$, the processing module 12 determines allocated resource blocks in each of the R basic resource elements and an allocated resource block in each of the L-R basic resource elements based on the location information that is of the allocated resource blocks in the one basic resource element and that is indicated in the first resource indication information, and combines the allocated resource blocks into the target resource, where a location of the allocated resource blocks in each of the R basic resource elements is the same as a location indicated by the first resource indication information, and the allocated resource block in each of the L-R basic resource elements is a resource block, in the basic resource element, that is corresponding to the location information indicated in the first resource indication information.

The user equipment is configured to perform the foregoing method embodiment shown in FIG. 1. Implementation principles thereof are similar, and details are not described herein again.

In this embodiment, a resource used by the UE for scheduling data transmission is allocated in the M basic resource elements in the N basic resource elements, and discrete resource blocks in the M basic resource elements are allocated to the UE, so that when maximum transmit power of the UE is limited by a requirement that a power spectral density should not be greater than an upper limit value, allowed maximum transmit power of the UE can be increased, and a coverage characteristic of the base station can be improved. For example, if the transmit power of the UE needs to be not greater than 10 dBm in any 1 MHz, when a resource of three resource blocks is allocated to the UE to send the uplink data, and if a resource-block-based resource allocation type in the prior art is used, the transmit power of the UE cannot exceed 10 dBm. However, if the foregoing basic-resource-element-based resource allocation manner provided in this embodiment of the present invention is used to evenly distribute the resource of the three RBs on three basic resource elements, and a distance between the three basic resource elements is greater than 1 MHz, the transmit power of the UE may be maximally 16 dBm, so that service coverage of the base station is significantly improved.

Figure 12:
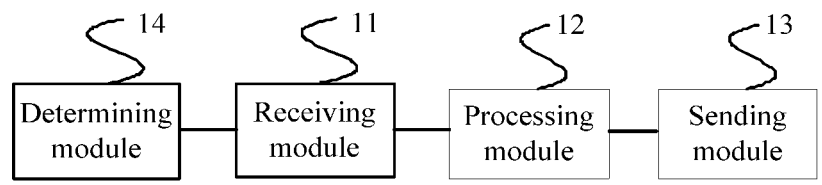
FIG. 12 is a schematic structural diagram of Embodiment 2 of user equipment according to the present invention.

FIG. 12 is a schematic structural diagram of Embodiment 2 of user equipment according to the present invention. As shown in FIG. 12, based on the user equipment shown in FIG. 11, the user equipment may further include: a determining module 14. The determining module 14 is configured to determine a resource allocation type on the carrier used by the UE to send the uplink data. If the determined resource allocation type is a basic-resource-element-based resource allocation type, the processing module 12 determines the target resource based on the first resource indication information, and the sending module sends the uplink data on the target resource; if the determined resource allocation type is a first resource-block-based resource allocation type, the processing module 12 determines a location of a start resource block and a location of an end resource block in the allocated resource on the carrier based on resource allocation indication information in the uplink scheduling grant, and the sending module sends the uplink data on the start resource block, the end resource block, and all resource blocks between the start resource block and the end resource block; and/or, if the determined resource allocation type is a second resource-block-based resource allocation type, the processing module 12 determines a location of a first start resource block, a location of a first end resource block, a location of a second start resource block, and a location of a second end resource block in the allocated resource on the carrier based on resource allocation indication information in the uplink scheduling grant, and the sending module sends the uplink data on the target resource including the first start resource block, the first end resource block, all resource blocks between the first start resource block and the first end resource block, the second start resource block, the second end resource block, and all resource blocks between the second start resource block and the second end resource block.

Further, the determining module 14 is specifically configured to determine the resource allocation type on the carrier depending on whether the carrier is a carrier on an unlicensed spectrum; or the receiving module 11 is further configured to receive third resource indication information; and the determining module 14 is specifically configured to determine the resource allocation type on the carrier based on the third resource indication information, where the resource-block-based resource allocation type includes the first resource-block-based resource allocation type and/or the second resource-block-based resource allocation type, and the third resource indication information is indication information received by the UE by using higher layer signaling or is information carried in the uplink scheduling grant.

The user equipment is configured to perform the foregoing method embodiment shown in FIG. 1. Implementation principles thereof are similar, and details are not described herein again.

In this embodiment, flexibility of resource allocation when the basic-resource-element-based resource allocation type is used on the carrier can be improved. When a limitation that a power spectral density should not be greater than an upper limit value is not imposed on maximum uplink transmit power of the UE, the resource-block-based resource allocation type is used for the target resource allocated to the UE to send the uplink data, so as to support allocating all resource blocks on the carrier to the UE. When the maximum uplink transmit power of the UE is limited by a requirement that the power spectral density should not be greater than the upper limit value, the basic-resource-element-based resource allocation type is used for the target resource allocated to the UE to send the uplink data, so as to improve a service range of the base station and improve the flexibility of the resource allocation.

Figure 13:
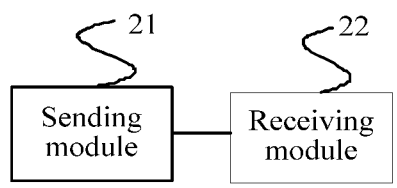
FIG. 13 is a schematic structural diagram of Embodiment 1 of a base station according to the present invention.

FIG. 13 is a schematic structural diagram of Embodiment 1 of a base station according to the present invention. As shown in FIG. 13, the base station includes: a sending module 21 and a receiving module 22. The sending module 21 is configured to send an uplink scheduling grant to UE. The uplink scheduling grant includes first resource indication information, so that the UE determines a target resource based on the first resource indication information. The target resource is allocated resource blocks in M basic resource elements, the M basic resource elements are basic resource elements in N basic resource elements on a carrier, and the carrier is a carrier that is indicated by the uplink scheduling grant and that is used by the UE to send uplink data. Each basic resource element includes at least one resource block, M and N are natural numbers, and M is not greater than N. The receiving module 22 is configured to receive the uplink data sent by the UE on the target resource.

The M basic resource elements are M preset basic resource elements in the N basic resource elements.

Further, the sending module 21 is configured to send second resource indication information to the UE. The second resource indication information is used to indicate location information of the M basic resource elements in the N basic resource elements to the UE, so that the UE determines a location of the M basic resource elements based on the second resource indication information.

Further, the N basic resource elements are divided into P basic resource element groups, and each of the P basic resource element groups includes at least one basic resource element. The second resource indication information is used to indicate location information of the M basic resource elements in one of the P basic resource element groups.

Optionally, the first resource indication information is used to indicate location information of allocated resource blocks in one basic resource element, so that the UE determines allocated resource blocks in each of the M basic resource elements based on the location information that is of the allocated resource blocks in the one basic resource element and that is indicated in the first resource indication information, and combines the allocated resource blocks into the target resource.

Optionally, the first resource indication information is used to indicate location information of L basic resource elements in the M basic resource elements, so that the UE determines, based on a location of the L basic resource elements, all resource blocks included in the L basic resource elements, and combines the resource blocks into the target resource.

Optionally, the first resource indication information is used to indicate location information of L basic resource elements in the M basic resource elements and location information of allocated resource blocks in one of the L basic resource elements, so that the UE determines a location of the L basic resource elements based on the first resource indication information, determines allocated resource blocks in each of the L basic resource elements based on the location information that is of the allocated resource blocks in the one basic resource element and that is indicated in the first resource indication information, and combines the allocated resource blocks into the target resource.

Further, the sending module 21 is further configured to send third resource indication information to the UE. The third resource indication information is used to indicate that a resource allocation type on the carrier is a basic-resource-element-based resource allocation type or a resource-block-based resource allocation type, and the third resource indication information is indication information sent by the base station to the UE by using higher layer signaling or is indication information carried in the uplink scheduling grant.

The base station is configured to perform the foregoing method embodiment shown in FIG. 1. Implementation principles thereof are similar, and details are not described herein again.

In this embodiment, the base station allocates a resource used by the UE for scheduling data transmission in the M basic resource elements in the N basic resource elements, and allocates discrete resource blocks in the M basic resource elements to the UE, so that when maximum transmit power of the UE is limited by a requirement that a power spectral density should not be greater than an upper limit value, allowed maximum transmit power of the UE can be increased, and a coverage characteristic of the base station can be improved.

Figure 14:
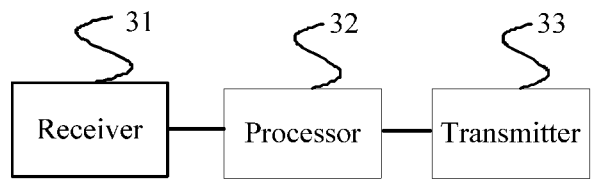
FIG. 14 is a schematic structural diagram of Embodiment 3 of user equipment according to the present invention.

FIG. 14 is a schematic structural diagram of Embodiment 3 of user equipment according to the present invention. As shown in FIG. 14, the user equipment includes: a receiver 31, a processor 32, and a transmitter 33. The receiver 31 is configured to receive an uplink scheduling grant, where the uplink scheduling grant includes first resource indication information. The processor 32 is configured to determine a target resource based on the first resource indication information, where the target resource is allocated resource blocks in M basic resource elements, the M basic resource elements are basic resource elements in N basic resource elements on a carrier, the carrier is a carrier that is indicated by the uplink scheduling grant and that is used by the UE to send uplink data, each basic resource element includes at least one resource block, M and N are natural numbers, and M is not greater than N. The transmitter 33 is configured to send the uplink data on the target resource.

The M basic resource elements are M preset basic resource elements in the N basic resource elements. Alternatively, the receiver 31 is further configured to receive second resource indication information, where the second resource indication information is used to indicate location information of the M basic resource elements in the N basic resource elements. The processor 32 is further configured to determine a location of the M basic resource elements based on the second resource indication information.

Further, the N basic resource elements are divided into P basic resource element groups, and each of the P basic resource element groups includes at least one basic resource element. The second resource indication information is used to indicate location information of the M basic resource elements in one of the P basic resource element groups.

Optionally, the first resource indication information is used to indicate location information of allocated resource blocks in one basic resource element. The processor 32 is specifically configured to: determine allocated resource blocks in each of the M basic resource elements based on the location information that is of the allocated resource blocks in the one basic resource element and that is indicated in the first resource indication information, and combine the allocated resource blocks into the target resource.

When each of the M basic resource elements includes a same quantity of resource blocks, the processor 32 determines the allocated resource blocks in each of the M basic resource elements based on the location information that is of the allocated resource blocks in the one basic resource element and that is indicated in the first resource indication information, and combines the allocated resource blocks into the target resource, where a location of the allocated resource blocks in each of the M basic resource elements is the same as a location indicated by the first resource indication information. Alternatively, when R basic resource elements in the M basic resource elements include a same quantity of resource blocks, where the quantity is $P_1$, and a quantity of resource blocks included in each of remaining M-R basic resource elements is not equal to $P_1$, the processor 32 determines allocated resource blocks in each of the R basic resource elements and an allocated resource block in each of the M-R basic resource elements based on the location information that is of the allocated resource blocks in the one basic resource element and that is indicated in the first resource indication information, and combines the allocated resource blocks into the target resource, where a location of the allocated resource blocks in each of the R basic resource elements is the same as a location indicated by the first resource indication information, and the allocated resource block in each of the M-R basic resource elements is a resource block, in the basic resource element, that is corresponding to the location information indicated in the first resource indication information.

Optionally, the first resource indication information is used to indicate location information of L basic resource elements in the M basic resource elements. The processor 32 is specifically configured to: determine a location of the L basic resource elements based on the first resource indication information, determine all resource blocks included in the L basic resource elements, and combine the resource blocks into the target resource.

Optionally, the first resource indication information is used to indicate location information of L basic resource elements in the M basic resource elements and location information of allocated resource blocks in one of the L basic resource elements. The processor 32 is specifically configured to: determine a location of the L basic resource elements based on the location information of the L basic resource elements that is indicated in the first resource indication information, determine allocated resource blocks in each of the L basic resource elements based on the location information that is of the allocated resource blocks in the one basic resource element and that is indicated in the first resource indication information, and combine the allocated resource blocks into the target resource.

When each of the L basic resource elements includes a same quantity of resource blocks, the processor 32 determines the allocated resource blocks in each of the L basic resource elements based on the location information that is of the allocated resource blocks in the one basic resource element and that is indicated in the first resource indication information, and combines the allocated resource blocks into the target resource, where a location of the allocated resource blocks in each of the L basic resource elements is the same as a location indicated by the first resource indication information. Alternatively, when R basic resource elements in the L basic resource elements include a same quantity of resource blocks, where the quantity is $P_1$, and a quantity of resource blocks included in each of remaining L-R basic resource elements is not equal to $P_1$, the processor 32 determines allocated resource blocks in each of the R basic resource elements and an allocated resource block in each of the L-R basic resource elements based on the location information that is of the allocated resource blocks in the one basic resource element and that is indicated in the first resource indication information, and combines the allocated resource blocks into the target resource, where a location of the allocated resource blocks in each of the R basic resource elements is the same as a location indicated by the first resource indication information, and the allocated resource block in each of the L-R basic resource elements is a resource block, in the basic resource element, that is corresponding to the location information indicated in the first resource indication information.

The user equipment is configured to perform the foregoing method embodiment shown in FIG. 1. Implementation principles thereof are similar, and details are not described herein again.

In this embodiment, a resource used by the UE for scheduling data transmission is allocated in the M basic resource elements in the N basic resource elements, and discrete resource blocks in the M basic resource elements are allocated to the UE, so that when maximum transmit power of the UE is limited by a requirement that a power spectral density should not be greater than an upper limit value, allowed maximum transmit power of the UE can be increased, and a coverage characteristic of the base station can be improved. For example, if the transmit power of the UE needs to be not greater than 10 dBm in any 1 MHz, when a resource of three resource blocks is allocated to the UE to send the uplink data, and if a resource-block-based resource allocation type in the prior art is used, the transmit power of the UE cannot exceed 10 dBm. However, if the foregoing basic-resource-element-based resource allocation manner provided in this embodiment of the present invention is used to evenly distribute the resource of the three RBs on three basic resource elements, and a distance between the three basic resource elements is greater than 1 MHz, the transmit power of the UE may be maximally 16 dBm, so that service coverage of the base station is significantly improved.

Further, the processor 32 is configured to determine a resource allocation type on the carrier used by the UE to send the uplink data. If the determined resource allocation type is a basic-resource-element-based resource allocation type, the processor 32 determines the target resource based on the first resource indication information, and the transmitter sends the uplink data on the target resource. If the determined resource allocation type is a first resource-block-based resource allocation type, the processor 32 determines a location of a start resource block and a location of an end resource block in the allocated resource on the carrier based on resource allocation indication information in the uplink scheduling grant, and the transmitter sends the uplink data on the start resource block, the end resource block, and all resource blocks between the start resource block and the end resource block; and/or, if the determined resource allocation type is a second resource-block-based resource allocation type, the processor 32 determines a location of a first start resource block, a location of a first end resource block, a location of a second start resource block, and a location of a second end resource block in the allocated resource on the carrier based on resource allocation indication information in the uplink scheduling grant, and the transmitter sends the uplink data on the target resource including the first start resource block, the first end resource block, all resource blocks between the first start resource block and the first end resource block, the second start resource block, the second end resource block, and all resource blocks between the second start resource block and the second end resource block.

Further, the processor 32 is specifically configured to determine the resource allocation type on the carrier depending on whether the carrier is a carrier on an unlicensed spectrum; or the receiver 31 is further configured to receive third resource indication information, and the processor 32 is specifically configured to determine the resource allocation type on the carrier based on the third resource indication information, where the third resource indication information is indication information received by the UE by using higher layer signaling or is information carried in the uplink scheduling grant.

The user equipment is configured to perform the foregoing method embodiment shown in FIG. 1. Implementation principles thereof are similar, and details are not described herein again.

In this embodiment, flexibility of resource allocation when the basic-resource-element-based resource allocation type is used on the carrier can be improved. When a limitation that a power spectral density should not be greater than an upper limit value is not imposed on maximum uplink transmit power of the UE, the resource-block-based resource allocation type is used for the target resource allocated to the UE to send the uplink data, so as to support allocating all resource blocks on the carrier to the UE. When the maximum uplink transmit power of the UE is limited by a requirement that the power spectral density should not be greater than the upper limit value, the basic-resource-element-based resource allocation type is used for the target resource allocated to the UE to send the uplink data, so as to improve a service range of the base station and improve the flexibility of the resource allocation.

Figure 15:
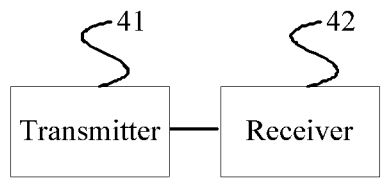
FIG. 15 is a schematic structural diagram of Embodiment 2 of a base station according to the present invention.

FIG. 15 is a schematic structural diagram of Embodiment 2 of a base station according to the present invention. As shown in FIG. 15, the base station includes: a transmitter 41 and a receiver 42. The transmitter 41 is configured to send an uplink scheduling grant to UE. The uplink scheduling grant includes first resource indication information, so that the UE determines a target resource based on the first resource indication information. The target resource is allocated resource blocks in M basic resource elements, the M basic resource elements are basic resource elements in N basic resource elements on a carrier, and the carrier is a carrier that is indicated by the uplink scheduling grant and that is used by the UE to send uplink data. Each basic resource element includes at least one resource block, M and N are natural numbers, and M is not greater than N. The receiver 42 is configured to receive the uplink data sent by the UE on the target resource.

The M basic resource elements are M preset basic resource elements in the N basic resource elements.

Further, the transmitter 41 is configured to send second resource indication information to the UE. The second resource indication information is used to indicate location information of the M basic resource elements in the N basic resource elements to the UE, so that the UE determines a location of the M basic resource elements based on the second resource indication information.

Further, the N basic resource elements are divided into P basic resource element groups, and each of the P basic resource element groups includes at least one basic resource element. The second resource indication information is used to indicate location information of the M basic resource elements in one of the P basic resource element groups.

Optionally, the first resource indication information is used to indicate location information of allocated resource blocks in one basic resource element, so that the UE determines allocated resource blocks in each of the M basic resource elements based on the location information that is of the allocated resource blocks in the one basic resource element and that is indicated in the first resource indication information, and combines the allocated resource blocks into the target resource.

Optionally, the first resource indication information is used to indicate location information of L basic resource elements in the M basic resource elements, so that the UE determines, based on a location of the L basic resource elements, all resource blocks included in the L basic resource elements, and combines the resource blocks into the target resource.

Optionally, the first resource indication information is used to indicate location information of L basic resource elements in the M basic resource elements and location information of allocated resource blocks in one of the L basic resource elements, so that the UE determines a location of the L basic resource elements based on the first resource indication information, determines allocated resource blocks in each of the L basic resource elements based on the location information that is of the allocated resource blocks in the one basic resource element and that is indicated in the first resource indication information, and combines the allocated resource blocks into the target resource.

Further, the transmitter 41 is configured to send third resource indication information to the UE. The third resource indication information is used to indicate that a resource allocation type on the carrier is a basic-resource-element-based resource allocation type or a resource-block-based resource allocation type. The resource-block-based resource allocation type includes a first resource-block-based resource allocation type and/or a second resource-block-based resource allocation type. The third resource indication information is indication information sent by the base station to the UE by using higher layer signaling or is indication information carried in the uplink scheduling grant.

The base station is configured to perform the foregoing method embodiment shown in FIG. 1. Implementation principles thereof are similar, and details are not described herein again.

In this embodiment, the base station allocates a resource used by the UE for scheduling data transmission in the M basic resource elements in the N basic resource elements, and allocates discrete resource blocks in the M basic resource elements to the UE, so that when maximum transmit power of the UE is limited by a requirement that a power spectral density should not be greater than an upper limit value, allowed maximum transmit power of the UE can be increased, and a coverage characteristic of the base station can be improved.

Figure 16:
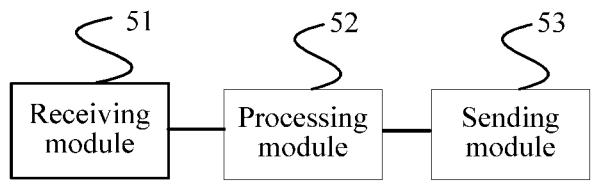
FIG. 16 is a schematic structural diagram of Embodiment 4 of user equipment according to the present invention.

FIG. 16 is a schematic structural diagram of Embodiment 4 of user equipment according to the present invention. As shown in FIG. 16, the user equipment includes: a receiving module 51, a processing module 52, and a sending module 53. The receiving module 51 is configured to receive an uplink scheduling grant, where the uplink scheduling grant includes first resource indication information. The processing module 52 is configured to determine a target resource based on the first resource indication information, where a resource indicated by the first resource indication information includes P resource blocks, the P resource blocks are resource blocks on a carrier, and the carrier is a carrier that is indicated by the uplink scheduling grant and that is used by the UE to send uplink data. If P satisfies $P=2^{\alpha_2} \cdot 3^{\alpha_3} \cdot 5^{60} {}_5$, where $\alpha_2$, $\alpha_3$, $\alpha_5$ are nonnegative integers, the target resource is the P resource blocks. If P does not satisfy $P=2^{\alpha_2} \cdot 3^{\alpha_3} \cdot 5^{60} {}_5$, where $\alpha_2$, $\alpha_3$, $\alpha_5$ are nonnegative integers, the target resource is Q resource blocks, where Q is a largest integer that satisfies $Q=2^{\alpha_2} \cdot 3^{\alpha_3} \cdot 5^{60} {}_5$ and Q<P, and $\alpha_2$, $\alpha_3$, $\alpha_5$ are nonnegative integer. The sending module 53 is configured to send the uplink data on the target resource.

Further, the Q resource blocks are Q resource blocks whose resource block index values are the largest in the P resource blocks, or the Q resource blocks are Q resource blocks whose resource block index values are the smallest in the P resource blocks.

The user equipment is configured to perform the foregoing method embodiment shown in FIG. 10. Implementation principles thereof are similar, and details are not described herein again.

In this embodiment, the processing module determines the target resource based on the first resource indication information. If a quantity of allocated resource blocks that is indicated by the first resource indication information is P, and P does not satisfy $P=2^{\alpha_2} \cdot 3^{\alpha_3} \cdot 5^{60} {}_5$, where $\alpha_2$, $\alpha_3$, $\alpha_5$ are nonnegative integers, both the base station and the UE determine the Q resource blocks in the resource of the P resource blocks by using a preset method, where Q satisfies $Q=2^{\alpha_2} \cdot 3^{\alpha_3} \cdot 5^{60} {}_5$, and $\alpha_2$, $\alpha_3$, $\alpha_5$ are nonnegative integers. The sending module sends the data on a resource of the Q resource blocks, and performs, on the to-be-sent data, DFT of a length being a value of a quantity of subcarriers occupied by the Q resource blocks in frequency domain, thereby not increasing implementation complexity of the UE. Otherwise, the UE sends the data on the resource of the P resource blocks. This avoids quite high implementation complexity due to that DFT needs to be performed on the data when the UE sends the data on the target resource.

Figure 17:
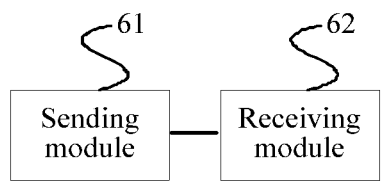
FIG. 17 is a schematic structural diagram of Embodiment 3 of a base station according to the present invention.

FIG. 17 is a schematic structural diagram of Embodiment 3 of a base station according to the present invention. As shown in FIG. 17, the base station includes: a sending module 61 and a receiving module 62. The sending module 61 is configured to send an uplink scheduling grant. The uplink scheduling grant includes first resource indication information, so that UE determines a target resource based on the first resource indication information. A resource indicated by the first resource indication information includes P resource blocks, the P resource blocks are resource blocks on a carrier, and the carrier is a carrier that is indicated by the uplink scheduling grant and that is used by the UE to send uplink data. If P satisfies $P=2^{\alpha_2} \cdot 3^{\alpha_3} \cdot 5^{60} {}_5$, where $\alpha_2$, $\alpha_3$, $\alpha_5$ are nonnegative integers, the target resource is the P resource blocks. If P does not satisfy $P=2^{\alpha_2} \cdot 3^{\alpha_3} \cdot 5^{60} {}_5$, where $\alpha_2$, $\alpha_3$, $\alpha_5$ are nonnegative integers, the target resource is Q resource blocks, where Q is a largest integer that satisfies $Q=2^{\alpha_2} \cdot 3^{\alpha_3} \cdot 5^{\alpha_5 5}$ and Q<P, and $\alpha_2$, $\alpha_3$, $\alpha_5$ are nonnegative integers. The receiving module 62 is configured to receive the uplink data sent by the UE on the target resource.

Further, the Q resource blocks are Q resource blocks whose resource block index values are the largest in the P resource blocks, or the Q resource blocks are Q resource blocks whose resource block index values are the smallest in the P resource blocks.

The base station is configured to perform the foregoing method embodiment shown in FIG. 10. Implementation principles and technical effects thereof are similar, and details are not described herein again.

Figure 18:
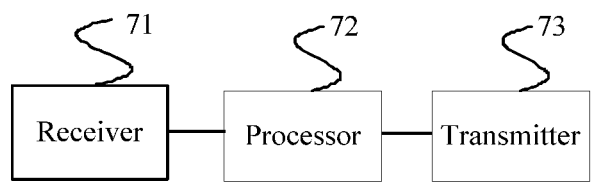
FIG. 18 is a schematic structural diagram of Embodiment 5 of user equipment according to the present invention.

FIG. 18 is a schematic structural diagram of Embodiment 5 of user equipment according to the present invention. As shown in FIG. 18, the user equipment includes: a receiver 71, a processor 72, and a transmitter 73. The receiver 71 is configured to receive an uplink scheduling grant, where the uplink scheduling grant includes first resource indication information. The processor 72 is configured to determine a target resource based on the first resource indication information, where a resource indicated by the first resource indication information includes P resource blocks, the P resource blocks are resource blocks on a carrier, and the carrier is a carrier that is indicated by the uplink scheduling grant and that is used by the UE to send uplink data. If P satisfies $P=2^{\alpha_2} \cdot 3^{\alpha_3} \cdot 5^{60} {}_5$, where $\alpha_2$, $\alpha_3$, $\alpha_5$ are nonnegative integers, the target resource is the P resource blocks. If P does not satisfy $P=2^{\alpha_2} \cdot 3^{\alpha_3} \cdot 5^{60} {}_5$, where $\alpha_2$, $\alpha_3$, $\alpha_5$ are nonnegative integers, the target resource is Q resource blocks, where Q is a largest integer that satisfies $Q=2^{\alpha_2} \cdot 3^{\alpha_3} \cdot 5^{\alpha_5 5}$ and Q<P, and $\alpha_2$, $\alpha_3$, $\alpha_5$ are nonnegative integers. The transmitter 73 is configured to send the uplink data on the target resource.

Further, the Q resource blocks are Q resource blocks whose resource block index values are the largest in the P resource blocks, or the Q resource blocks are Q resource blocks whose resource block index values are the smallest in the P resource blocks.

The user equipment is configured to perform the foregoing method embodiment shown in FIG. 10. Implementation principles thereof are similar, and details are not described herein again.

In this embodiment, the processor determines the target resource based on the first resource indication information. If a quantity of allocated resource blocks that is indicated by the first resource indication information is P, and P does not satisfy $P=2^{\alpha_2} \cdot 3^{\alpha_3} \cdot 5^{60} {}_5$, where $\alpha_2$, $\alpha_3$, $\alpha_5$ are nonnegative integers, both the base station and the UE determine the Q resource blocks in the resource of the P resource blocks by using a preset method, where Q satisfies $Q=2^{\alpha_2} \cdot 3^{\alpha_3} \cdot 5^{\alpha_5 5}$, and $\alpha_2$, $\alpha_3$, $\alpha_5$ are nonnegative integers. The transmitter sends the data on a resource of the Q resource blocks, and performs, on the to-be-sent data, DFT of a length being a value of a quantity of subcarriers occupied by the Q resource blocks in frequency domain, thereby not increasing implementation complexity of the UE. Otherwise, the UE sends the data on the resource of the P resource blocks. This avoids quite high implementation complexity due to that DFT needs to be performed on the data when the UE sends the data on the target resource.

Figure 19:
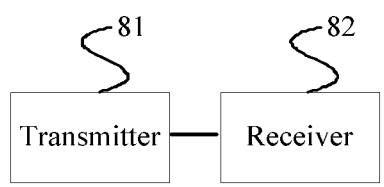
FIG. 19 is a schematic structural diagram of Embodiment 4 of a base station according to the present invention.

FIG. 19 is a schematic structural diagram of Embodiment 3 of a base station according to the present invention. As shown in FIG. 19, the base station includes: a transmitter 81 and a receiver 82. The transmitter 81 is configured to send an uplink scheduling grant. The uplink scheduling grant includes first resource indication information, so that UE determines a target resource based on the first resource indication information. A resource indicated by the first resource indication information includes P resource blocks, the P resource blocks are resource blocks on a carrier, and the carrier is a carrier that is indicated by the uplink scheduling grant and that is used by the UE to send uplink data. If P satisfies $P=2^{\alpha_2} \cdot 3^{\alpha_3} \cdot 5^{60} {}_5$, where $\alpha_2$, $\alpha_3$, $\alpha_5$ are nonnegative integers, the target resource is the P resource blocks. If P does not satisfy $P=2^{\alpha_2} \cdot 3^{\alpha_3} \cdot 5^{60} {}_5$, where $\alpha_2$, $\alpha_3$, $\alpha_5$ are nonnegative integers, the target resource is Q resource blocks, where Q is a largest integer that satisfies $Q=2^{\alpha_2} \cdot 3^{\alpha_3} \cdot 5^{\alpha_5 5}$ and Q<P, and $\alpha_2$, $\alpha_3$, $\alpha_5$ are nonnegative integers. The receiver 82 is configured to receive the uplink data sent by the UE on the target resource.

Further, the Q resource blocks are Q resource blocks whose resource block index values are the largest in the P resource blocks, or the Q resource blocks are Q resource blocks whose resource block index values are the smallest in the P resource blocks.

The base station is configured to perform the foregoing method embodiment shown in FIG. 10. Implementation principles and technical effects thereof are similar, and details are not described herein again.

The embodiments in this specification are all described in a progressive manner. For same or similar parts in the embodiments, refer to these embodiments. Each embodiment focuses on a difference from other embodiments. Especially, a system embodiment is basically similar to a method embodiment, and therefore is described briefly. For related parts, refer to partial descriptions in the method embodiment.

A person of ordinary skill in the art may understand that, each aspect of this application or a possible implementation of each aspect may be specifically implemented as a system, a method, or a computer program product. Therefore, aspects of this application or possible implementations of the aspects may use forms of hardware only embodiments, software only embodiments (including firmware, resident software, and the like), or embodiments with a combination of software and hardware, which are uniformly referred to as "circuit", "module", or "system" herein. In addition, the aspects of this application or the possible implementations of the aspects may take a form of a computer program product, where the computer program product refers to computer-readable program code stored in a computer-readable medium.

The computer-readable medium may be a computer-readable signal medium or a computer-readable storage medium. The computer-readable storage medium includes but is not limited to an electronic, magnetic, optical, electromagnetic, infrared, or semi-conductive system, device, or apparatus, or any appropriate combination thereof, such as a random access memory (RAM), a read-only memory (ROM), an erasable programmable read only memory (EPROM or flash memory), an optical fiber, and a compact disc read only memory (CD-ROM).

A processor in a computer reads computer-readable program code stored in a computer-readable medium, so that the processor can perform a function and an action specified in each step or a combination of steps in a flowchart, and an apparatus is generated to implement a function and an action specified in each block or a combination of blocks in a block diagram.

The computer-readable program code may be fully executed on a local computer of a user, or partially executed on a local computer of a user, or used as a standalone software package, or partially executed on a local computer of a user and partially executed on a remote computer, or fully executed on a remote computer or a server. It should also be noted that, in some alternative implementation solutions, steps in the flowcharts or functions specified in each block in the block diagrams may not occur in the illustrated order. For example, two consecutive steps or two blocks in the illustration, which are dependent on an involved function, may actually be executed substantially at the same time, or these blocks may sometimes be executed in reverse order.

Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A data sending method comprising:
receiving, by user equipment (UE), an uplink scheduling grant indicating a carrier for the UE to send uplink data, the carrier being evenly divided into N basic resource units, wherein N is a natural number and N>1, wherein each of the N basic resource units comprises multiple continuous resource blocks, wherein a target resource that is to be allocated to the UE is evenly distributed in the N basic resource units, wherein the uplink scheduling grant comprises first resource indication information indicating location information of allocated resource blocks in only one of the N basic resource units, and wherein the allocated resource blocks in one of the N basic resource units are part of all the resource blocks in one of the N basic resource units;
determining, by the UE, the target resource distributed in all the N basic resource units based on the first resource indication information indicating location information of allocated resource blocks in only one of the N basic resource units, wherein the target resource is a combination of the allocated resource blocks in each of the N basic resource units, and a location of the allocated resource blocks in each of the N basic resource units has the same relative location as a location indicated by the location information in the first resource indication information; and
sending, by the UE, the uplink data on the target resource.

2. The method according to claim 1, further comprising:
determining, by the UE, a resource allocation type on the carrier for the UE to send the uplink data; and
in response to determining that the determined resource allocation type is a basic-resource-element-based resource allocation type, determining, by the UE, the target resource based on the first resource indication information, and sending the uplink data on the target resource;
in response to determining that the determined resource allocation type is a first resource-block-based resource allocation type, determining, by the UE, a location of a start resource block and a location of an end resource block in the allocated resource blocks on the carrier based on resource allocation indication information in the uplink scheduling grant, and sending the uplink data on the start resource block, the end resource block, and all resource blocks between the start resource block and the end resource block; and/or
in response to determining that the determined resource allocation type is a second resource-block-based resource allocation type, determining, by the UE, a location of a first start resource block of a start resource block, a location of a first end resource block, a location of a second start resource block, and a location of a second end resource block in the allocated resource blocks on the carrier based on resource allocation indication information in the uplink scheduling grant, and sending the uplink data on the target resource consisting of the first start resource block, the first end resource block, all resource blocks between the first start resource block and the first end resource block, the second start resource block, the second end resource block, and all resource blocks between the second start resource block and the second end resource block.

3. The method according to claim 2, wherein the determining a resource allocation type comprises:
determining, by the UE, the resource allocation type on the carrier depending on whether the carrier is on an unlicensed spectrum; or
receiving, by the UE, third resource indication information, and determining the resource allocation type on the carrier based on the third resource indication information, wherein the third resource indication information is received by the UE by using higher layer signaling or is carried in the uplink scheduling grant.

4. A data receiving method comprising:
sending, by a base station, an uplink scheduling grant to user equipment (UE), wherein the uplink scheduling grant indicates a carrier for the UE to send uplink data, the carrier being evenly divided into N basic resource units, wherein N is a natural number and N>1, wherein each of the N basic resource units comprises multiple continuous resource blocks, wherein a target resource that is to be allocated to the UE is evenly distributed in the N basis resource units, wherein the uplink scheduling grant comprises first resource indication information indicating location information of allocated resource blocks in only one of the N basic resource units, and wherein the allocated resource blocks in one of the N basic resource units are part of all the resource blocks in one of the N basic resource units; and
receiving, by the base station, the uplink data on the target resource distributed in all the N basic resource units that is a combination of the allocated resource blocks in each of the N basic resource units, wherein the target resource has been determined based on the first resource indication information indicating location information of allocated resource blocks in only one of the N basic resource units, wherein a location of the allocated resource blocks in each of the N basic resource units has the same relative location as a location indicated by the location information in the first resource indication information.

5. The method according to claim 4, further comprising:
sending, by the base station, third resource indication information to the UE, wherein the third resource indication information indicates that a resource allocation type on the carrier is a basic-resource-element-based resource allocation type or a resource-block-based resource allocation type, the resource-block-based resource allocation type comprises a first resource-block-based resource allocation type and/or a second resource-block-based resource allocation type, and the third resource indication information is sent by the base station to the UE by using higher layer signaling or is carried in the uplink scheduling grant.

6. User equipment (UE) comprising:
a transceiver;
a non-transitory memory storage comprising instructions; and
one or more hardware processors in communication with the non-transitory memory storage, wherein the one or more hardware processors execute the instructions to:
receive an uplink scheduling grant indicating a carrier for the UE to send uplink data, the carrier being evenly divided into N basic resource units, wherein N is a natural number and N>1, wherein each of the N basic resource units comprises multiple continuous resource blocks, wherein a target resource that is to be allocated to the UE is evenly distributed in the N basis resource units, wherein the uplink scheduling grant comprises first resource indication information indicating location information of allocated resource blocks in only one of the N basic resource units, and wherein the allocated resource blocks in one of the N basic resource units are part of all the resource blocks in one of the N basic resource units;
determine the target resource distributed in all the N basic resource units based on the first resource indication information indicating location information of allocated resource blocks in only one of the N basic resource units, wherein the target resource is a combination of the allocated resource blocks in each of the N basic resource units, and a location of the allocated resource blocks in each of the N basic resource units has the same relative location as a location indicated by the location information in the first resource indication information; and
send, using the transceiver, the uplink data on the target resource.

7. The user equipment according to claim 6, the one or more hardware processors further execute the instructions to:
determine a resource allocation type on the carrier for the UE to send the uplink data, wherein in response to determining that the determined resource allocation type is a first resource-block-based resource allocation type, determine a location of a start resource block and a location of an end resource block in the allocated resource on the carrier based on resource allocation indication information in the uplink scheduling grant, and send the uplink data on the start resource block, the end resource block, and all resource blocks between the start resource block and the end resource block; and/or
in response to determining that the determined resource allocation type is a second resource-block-based resource allocation type, determine a location of a first start resource block of a start resource block, a location of a first end resource block, a location of a second start resource block, and a location of a second end resource block in the allocated resource on the carrier based on resource allocation indication information in the uplink scheduling grant, and send the uplink data on the target resource consisting of the first start resource block, the first end resource block, all resource blocks between the first start resource block and the first end resource block, the second start resource block, the second end resource block, and all resource blocks between the second start resource block and the second end resource block.

8. The user equipment according to claim 7, wherein the one or more hardware processors further execute the instructions to:
determine the resource allocation type on the carrier depending on whether the carrier is on an unlicensed spectrum; or
receive third resource indication information, and determine the resource allocation type on the carrier based on the third resource indication information, wherein the third resource indication information is received by the UE by using higher layer signaling or is carried in the uplink scheduling grant.

9. A base station comprising:
a transceiver;
a non-transitory memory storage comprising instructions; and one or more hardware processors in communication with the non-transitory memory storage, wherein the one or more hardware processors execute the instructions to:

send an uplink scheduling grant to user equipment (UE), wherein the uplink scheduling grant indicates a carrier for the UE to send uplink data, the carrier being evenly divided into N basic resource units, wherein N is a natural number and N>1, wherein each of the N basic resource units comprises multiple continuous resource blocks, wherein a target resource that is to be allocated to the UE is evenly distributed in the N basis resource units, wherein the uplink scheduling grant comprises first resource indication information indicating location information of allocated resource blocks in only one of the N basic resource units, and wherein the allocated resource blocks in one of the N basic resource units are part of all the resource blocks in one of the N basic resource units; and receive the uplink data from by the UE on the target resource distributed in all the N basic resource units that is a combination of the allocated resource blocks in each of the N basic resource units, wherein the target resource has been determined based on the first resource indication information indicating location information of allocated resource blocks in only one of the N basic resource units, wherein a location of the allocated resource blocks in each of the N basic resource units has the same relative location as a location indicated by the location information in the first resource indication information.

10. The base station according to claim 9, wherein the one or more hardware processors further execute the instructions to:

send third resource indication information to the UE, wherein the third resource indication information indicates that a resource allocation type on the carrier is a basic-resource-element-based resource allocation type or a resource-block-based resource allocation type, the resource-block-based resource allocation type comprises a first resource-block-based resource allocation type and/or a second resource-block-based resource allocation type, and the third resource indication information is sent by the base station to the UE by using higher layer signaling or is carried in the uplink scheduling grant.

11. A non-transitory computer readable storage medium, comprising computer program codes which when executed by a computer processor cause the computer processor to execute:

receive an uplink scheduling grant indicating a carrier for the computer processor to send uplink data, the carrier being evenly divided into N basic resource units, wherein N is a natural number and N>1, wherein each of the N basic resource units comprises multiple continuous resource blocks, wherein a target resource that is to be allocated to the computer processor is evenly distributed in the N basis resource units, wherein the uplink scheduling grant comprises first resource indication information indicating location information of allocated resource blocks in only one of the N basic resource units, and wherein the allocated resource blocks in one of the N basic resource units are part of all the resource blocks in one of the N basic resource units;

determine the target resource distributed in all the N basic resource units based on the first resource indication information indicating location information of allocated resource blocks in only one of the N basic resource units, wherein the target resource is a combination of the allocated resource blocks in each of the N basic resource units, and a location of the allocated resource blocks in each of the N basic resource units has the same relative location as a location indicated by the location information in the first resource indication information;

and send the uplink data on the target resource.

12. The non-transitory computer readable storage medium according to claim 11, further comprising computer program codes which when executed by a computer processor cause the computer processor to:

determine a resource allocation type on the carrier for the computer processor to send the uplink data; and in response to determining that the determined resource allocation type is a basic-resource-element-based resource allocation type, determining the target resource based on the first resource indication information, and sending the uplink data on the target resource;

in response to determining that the determined resource allocation type is a first resource-block-based resource allocation type, determining a location of a start resource block and a location of an end resource block in the allocated resource on the carrier based on resource allocation indication information in the uplink scheduling grant, and sending the uplink data on the start resource block, the end resource block, and all resource blocks between the start resource block and the end resource block; and/or in response to determining that the determined resource allocation type is a second resource-block-based resource allocation type, determining a location of a first start resource block of a start resource block, a location of a first end resource block, a location of a second start resource block, and a location of a second end resource block in the allocated resource on the carrier based on resource allocation indication information in the uplink scheduling grant, and sending the uplink data on the target resource consisting of the first start resource block, the first end resource block, all resource blocks between the first start resource block and the first end resource block, the second start resource block, the second end resource block, and all resource blocks between the second start resource block and the second end resource block;

wherein the determining a resource allocation type on the carrier comprises:

determining the resource allocation type on the carrier depending on whether the carrier is on an unlicensed spectrum; or receiving third resource indication information, and determining the resource allocation type on the carrier based on the third resource indication information, wherein the third resource indication information is received by using higher layer signaling or is carried in the uplink scheduling grant.

* * * * *